(12) United States Patent
Karam et al.

(10) Patent No.: US 11,346,984 B2
(45) Date of Patent: May 31, 2022

(54) LIQUID LENSES

(71) Applicant: CORNING INCORPORATED, Corning, NY (US)

(72) Inventors: Raymond Miller Karam, Santa Barbara, CA (US); Ming Ying, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 232 days.

(21) Appl. No.: 16/484,353

(22) PCT Filed: Feb. 7, 2018

(86) PCT No.: PCT/US2018/017228
§ 371 (c)(1),
(2) Date: Aug. 7, 2019

(87) PCT Pub. No.: WO2018/148283
PCT Pub. Date: Aug. 16, 2018

(65) Prior Publication Data
US 2020/0003934 A1 Jan. 2, 2020

Related U.S. Application Data

(60) Provisional application No. 62/457,076, filed on Feb. 9, 2017.

(51) Int. Cl.
*G02B 1/06* (2006.01)
*G02F 1/03* (2006.01)
(Continued)

(52) U.S. Cl.
CPC ............... *G02B 3/14* (2013.01); *G02B 7/28* (2013.01); *G02B 26/004* (2013.01)

(58) Field of Classification Search
CPC ...... G02B 3/0056; G02B 3/14; G02B 15/173; G02B 15/17; G02B 7/08; G02C 5/00;
(Continued)

(56) References Cited

U.S. PATENT DOCUMENTS

| 6,188,526 B1 | 2/2001 | Sasaya et al. |
| 7,773,306 B2 | 8/2010 | Van As et al. |

(Continued)

FOREIGN PATENT DOCUMENTS

| CN | 1784628 A | 6/2006 |
| CN | 1989428 A | 6/2007 |

(Continued)

OTHER PUBLICATIONS

Chinese Patent Application No. 201880023823.2, Office Action dated Apr. 15, 2021, 10 pages (4 pages of English Translation and 6 pages of Original Document), Chinese Patent Office.

(Continued)

*Primary Examiner* — Dawayne Pinkney

(57) ABSTRACT

A liquid lens can include a chamber and a first fluid and a second fluid contained in the chamber. The first fluid and the second fluid may be immiscible, forming a fluid interface between the two fluids. The liquid lens may also include a first electrode insulated from the two fluids. The liquid lens may include a second electrode in electrical communication with the first fluid. The liquid lens may be configured such that a position of the fluid interface is based at least in part on voltages applied to the electrodes. The lens may further include a window configured to transmit light therethrough along an optical axis. Further, a flexible member may be configured to cause the window to displace axially along the optical axis to change the volume of the chamber.

20 Claims, 18 Drawing Sheets

(51) Int. Cl.
*G02B 7/02* (2021.01)
*G02C 7/02* (2006.01)
*G02C 3/00* (2006.01)
*G02B 3/14* (2006.01)
*G02B 7/28* (2021.01)
*G02B 26/00* (2006.01)

(58) Field of Classification Search
CPC .. G02C 7/02; A61B 3/103; A61B 3/14; A61B 3/113; A61B 3/125; A61B 3/024; A61B 3/1015; A45B 25/02; F04B 43/046; H01L 41/22; H01L 41/042; H01L 41/044; G11B 5/5552
USPC ........ 359/665–666, 245–247, 676, 677, 819, 359/683, 824; 351/159.68, 159.75, 351/159.76, 178, 41, 159.01, 159.02, 351/159.03, 159.04, 159.34; 417/413.2; 29/25, 35; 310/311, 317–318; 360/294.4
See application file for complete search history.

(56) References Cited

U.S. PATENT DOCUMENTS

| | | | |
|---|---|---|---|
| 8,040,612 B2 | 10/2011 | Suijver et al. | |
| 8,310,772 B2* | 11/2012 | Henriksen | G02B 3/12 359/820 |
| 8,390,934 B2 | 3/2013 | Kong et al. | |
| 8,599,301 B2 | 12/2013 | Dowski et al. | |
| 9,201,174 B2 | 12/2015 | Karam et al. | |
| 9,492,990 B2 | 11/2016 | Karam et al. | |
| 10,838,116 B2* | 11/2020 | Mastrangelo | G02C 7/085 |
| 2006/0126190 A1 | 6/2006 | Berge et al. | |
| 2006/0285220 A1* | 12/2006 | Van As | G02B 3/14 359/665 |
| 2007/0247724 A1 | 10/2007 | Jung | |
| 2008/0144185 A1* | 6/2008 | Wang | H04N 5/2353 359/665 |
| 2010/0232028 A1 | 9/2010 | Takai | |
| 2010/0276491 A1* | 11/2010 | Havens | G02B 3/12 235/470 |
| 2012/0105971 A1 | 5/2012 | Lee et al. | |
| 2012/0150292 A1 | 6/2012 | Mentak et al. | |
| 2014/0347741 A1 | 11/2014 | Karam et al. | |
| 2016/0299264 A1 | 10/2016 | Karam et al. | |
| 2019/0377236 A1* | 12/2019 | Jang | G02C 7/08 |

FOREIGN PATENT DOCUMENTS

| | | |
|---|---|---|
| CN | 102089681 A | 6/2011 |
| JP | 2000-081504 A | 3/2000 |
| JP | 2009-168971 A | 7/2009 |
| JP | 2011-112757 A | 6/2011 |
| KR | 10-2007-0095525 A | 10/2007 |
| TW | 201107795 A | 3/2011 |
| WO | 2007058451 A1 | 5/2007 |
| WO | 2008/018387 A1 | 2/2008 |
| WO | 2009/090585 A1 | 7/2009 |
| WO | 2015/095891 A1 | 6/2015 |
| WO | 2018139897 A1 | 8/2018 |
| WO | 2018148283 A1 | 8/2018 |

OTHER PUBLICATIONS

International Search Report and Written Opinion of the International Searching Authority; PCT/US2018/017228; dated Jul. 23, 2018; 17 Pages; European Patent Office.

Japanese Patent Application No. 2019-543096, Office Action, dated Feb. 2, 2022, 8 pages (4 pages of English Translation and 4 pages of Original Copy); Japanese Patent Office.

Taiwanese Patent Application No. 107104637, Office Action, dated Feb. 7, 2022, 1 page; Taiwanese Patent Office.

* cited by examiner

LIQUID LENSES

CROSS-REFERENCE TO RELATED APPLICATIONS

This application claims the benefit of priority under 35 U.S.C. § 371 of International Application No. PCT/US2018/017228, filed on Feb. 7, 2018, which claims the benefit under 35 U.S.C. § 119(e) of U.S. Provisional Patent Application No. 62/457,076, filed on Feb. 9, 2017, and titled LIQUID LENSES, each of which is hereby incorporated by reference in its entirety and made a part of this specification.

INCORPORATION BY REFERENCE

U.S. Pat. No. 9,201,174 (the "'174 patent"), issued Dec. 1, 2015, and titled LIQUID LENS ARRAYS, is hereby incorporated by reference in its entirety. U.S. Patent Application Publication No. 2016/0299264 (the "'264 Publication"), published Oct. 13, 2016, and titled METHOD TO PREVENT EMULSION IN A LIQUID LENS, is hereby incorporated by reference in its entirety. U.S. Pat. No. 9,492,990 (the "'990 patent"), issued Nov. 15, 2016, and titled ROOM TEMPERATURE GLASS-TO-GLASS, GLASS-TO-PLASTIC AND GLASS-TO-CERAMIC/SEMICONDUCTOR BONDING, is hereby incorporated by reference in its entirety.

BACKGROUND

Field of the Disclosure

Some embodiments disclosed herein relate to liquid lenses.

Description of the Related Art

Although various liquid lenses are known, there remains a need for improved liquid lenses.

SUMMARY OF CERTAIN EMBODIMENTS

Certain example embodiments are summarized below for illustrative purposes. The embodiments are not limited to the specific implementations recited herein. Embodiments may include several novel features, no single one of which is essential or solely responsible for the desirable attributes described herein.

Some embodiments disclosed herein can relate to a liquid lens, which can include a chamber having a volume, a first fluid contained in the chamber, and a second fluid contained in the chamber. The first fluid and the second fluid can be substantially immiscible to form a fluid interface between the first fluid and the second fluid. The liquid lens can include one or more first electrodes insulated from the first and second fluids and one or more second electrodes in electrical communication with the first fluid. The liquid lens can be configured such that a position of the fluid interface is based at least in part on voltage applied between the first and second electrodes. The liquid lens can include a window configured to transmit light therethrough (e.g., along an optical axis). The liquid lens can include a flexure configured to cause the window to displace (e.g., axially along the optical axis) to change the volume of the chamber.

In some embodiments, the flexure is made of the same material as the window. The flexure can be integrally formed with the window. The window and the flexure can be made of glass. A glass plate can include the window and the flexure, and the flexure can include a plurality of concentric recesses surrounding the window. The plurality of concentric recesses can be formed on alternating sides of the glass plate.

When the liquid lens is in a flexed state, the window can be displaced (e.g., axially) by a flexure displacement distance from bending of the flexure and the window can be displaced (e.g., axially) by a window bend distance from bending of the window. The flexure displacement distance can be greater than the window bend distance. A ratio of the flexure displacement distance to the window bend distance can be at least 2 to 1, at least 4 to 1, and/or less than or equal to 12 to 1, although various other values can be used, as discussed herein. The window can be flexible. In some cases the flexure can be more flexible than the window. The window can flex to have a substantially spherical curvature or a substantially paraboloidal curvature. A thickness of the window can be greater than a thickness of the flexure. The flexure can be positioned circumferentially around the window. The flexure can impede light that impinges on the flexure from being transmitted through the liquid lens.

The liquid lens can have a thermally induced optical power change rate of no more than 0.1 diopters per degree C. The liquid lens can have a thermally induced optical power change rate of at least 0.02 diopters per degree C. Various other values can be used, as discussed herein.

Some embodiments can relate to a camera system that includes a liquid lens and a camera module, which can have an imaging sensor, and one or more fixed lenses configured to direct light onto the imaging sensor. Operating the camera module can produce heat that causes a change in a focal length of the one or more fixed lenses. The liquid lens can be thermally coupled to the camera module such that heat from the camera module can be transferred to the liquid lens. The heat transferred to the liquid lens can flex the window to produce a change in a focal length of the liquid lens, which can at least partially counter the change in the focal length of the one or more fixed lenses in the camera module.

Some embodiments disclosed herein can relate to a liquid lens that includes a chamber having a volume, a first fluid contained in the chamber, and a second fluid contained in the chamber. The first fluid and the second fluid can be substantially immiscible to form a fluid interface between the first fluid and the second fluid. The liquid lens can have one or more first electrodes insulated from the first and second fluids and one or more second electrodes in electrical communication with the first fluid. The liquid lens can be configured such that a position of the fluid interface can be based at least in part on voltage applied between the first and second electrodes. The liquid lens can have a window configured to transmit light therethrough (e.g., along an optical axis). The liquid lens can have a flexure, which can be configured to cause the window to displace (e.g., axially along the optical axis) to change the volume of the chamber.

In some embodiments, when the liquid lens is in a flexed state, the flexure can bend so that a peripheral portion of the window is displaced (e.g., axially) by a flexure displacement distance. When the liquid lens is in the flexed state, the window can bend so that a center portion of the window can be displaced (e.g., axially) by a total window displacement distance, which can be greater than the flexure displacement distance. The flexure displacement distance can be between 60% and 95% of the total window displacement distance. The flexure displacement distance can be between 70% and 90% of the total window displacement distance. The flexure displacement distance can be between 80% and 85% of the total window displacement distance.

Various embodiments disclosed herein can relate to a liquid lens, which can include a cavity having a first end and a second end. An optical axis can extend through the cavity from the first end to the second end. The liquid lens can have a plurality of fluids in the cavity, wherein the plurality of fluids form at least one fluid interface. The optical axis can extend through the at least one fluid interface. The liquid lens can have a support structure, which can be positioned radially outward of the first end of the cavity. A plate of material can include a window portion, which can be positioned over the first end of the cavity. The optical axis can extend through the window portion. The plate can include an attachment portion, which can be positioned radially outward of the window portion. The attachment portion can be attached to the support structure. The plate can include a flexure portion, which can be between the window portion and the attachment portion.

The flexure portion can be thinner than the window portion. The plate of material that has the window portion, the attachment portion, and the flexure portion can be a glass plate. The flexure portion can include a plurality of concentric recesses. The plate of material can have a first side and a second side opposite the first side. The flexure portion can include a first recess on the first side of the plate and a second recess adjacent to the first recess. The second recess can be on the second side of the plate. The flexure portion can include a third recess adjacent to the second recess, and the third recess can be on the first side of the plate. The flexure portion can include a fourth recess adjacent to the third recess, and the fourth recess can be on the second side of the plate.

The flexure portion can be made of glass and at least a part of the flexure portion can have a thickness of between 0.1 microns and 0.5 microns, between 0.15 microns and 0.4 microns, between 0.2 microns and 0.3 microns, although various other values can be used, as discussed herein. The flexure portion can have a thickness that is between 5% and 40% of a thickness of the window portion, or between 10% and 30% of a thickness of the window portion, although various other values can be used, as discussed herein. The plate of material can include a depression facing towards the cavity. The depression can extend across at least part of the flexure portion and/or at least part of the window portion.

In some embodiments the flexure can include one or more undulations, such as at least two undulations. The flexure can have a cross-sectional shape that includes a repeating non-linear pattern. The flexure can be a ring flexure. The flexure can surround the window. The flexure can be configured to be in fluid communication with at least one of the first and second fluids. The liquid lens can include an additional window, which can be configured to transmit light therethrough (e.g., along the optical axis). The window can be parallel to the additional window. The first fluid can be a polar fluid. The first fluid can be an aqueous solution. The first fluid can be a conductive fluid. The second fluid can be an insulating fluid. The second fluid can be an oil.

The liquid lens can substantially maintain one or more optical properties of the liquid lens when the first window is displaced due to pressure changes in the liquid lens. The one or more optical properties can include a focal length of the liquid lens. The substantially maintained one or more optical properties can include an amount of spherical aberration. In some embodiments, the liquid lens can have a shorter focal length in a flexed state than in an unflexed state.

In some embodiments, a camera system can include a liquid lens and a camera module in optical communication with the liquid lens. The camera module can be in conductive thermal communication with the liquid lens such that heat (e.g., produced by the camera module) is transferred to the liquid lens. The camera module can include an imaging sensor. The camera module can include one or more focusing optical elements configured to direct light onto the imaging sensor. The one or more focusing optical elements can include a one or a plurality of fixed lenses. The camera module can include electrical circuitry.

The liquid lens can displace the first window to at least partially counteract a change in an optical property of the camera module caused by thermal expansion within the camera module. The liquid lens can counteract the change in the optical property to within a variance of 50% from the change in the optical property of the camera module. The liquid lens can counteract the change in the optical property to within a variance of 25% from the change in the optical property of the camera module. The optical property can be focal length or optical power. In some embodiments, heat (e.g., produced by operation of the camera module) can cause a focal length of the camera module to lengthen, and wherein heat (e.g., transferred from the camera module to the liquid lens) can cause the focal length of the liquid lens to shorten. The focal length of the camera module can lengthen by a first amount and the focal length of the liquid lens can shorten by a second amount. The second amount can be within a variance of 50% from the first amount. The second amount can be within a variance of 25% of the first amount.

Some embodiments can relate to a window assembly for a liquid lens. The window assembly can include a transparent window element and a flexible member, which can be configured to displace the transparent window. The flexible member can be made of the same material as the transparent window. The transparent window and the flexible member can be made of glass, although other materials can also be used, as discussed herein.

Some embodiments can relate to a window assembly for a liquid lens. The window assembly can include a flexible transparent window element and a flexible member, which can be configured to displace the transparent window. The flexible member can be more flexible than the flexible transparent window. The window assembly can be configured such that the window element flexes to have a substantially spherical or paraboloidal curvature.

Some embodiments can relate to a camera system, which can include a camera module having an imaging sensor. Operating the camera module can produce heat, which can produce a change in an optical property of the camera module. In some cases, a liquid lens can be thermally coupled to the camera module, for example such that heat from the camera module can be transferred to the liquid lens. The liquid lens can be configured such that heat (e.g., transferred to the liquid lens and/or from ambient temperature) produces a change in an optical property of the liquid lens that at least partially counters the change in the optical property of the camera module. The optical property of the camera module can be a focal length of one or more focusing optical elements of the camera module. The optical property of the liquid lens can be a focal length of the liquid lens.

Some embodiments can relate to methods of making any of the various liquid lenses, camera systems, window elements, or other devices disclosed herein. Some embodiments can relate to methods of using any of the various liquid lenses, camera systems, window elements, or other devices disclosed herein.

Some embodiments can relate to a method for designing a liquid lens assembly for use with a camera module. The method can include heating a camera module, monitoring an optical property of the camera module during the heating of the camera module, determining a relationship between the optical property and the temperature of the camera module, setting a physical parameter of a liquid lens design based at least in part on the relationship between the optical property of the camera module and the temperature of the camera module.

The method can include testing a liquid lens having the physical parameter of the liquid lens design in operation with the camera module. The method can include adjusting the physical parameter of the liquid lens design based at least in part on the testing. Testing the liquid lens in operation with the camera module can include putting the liquid lens in conductive thermal communication with the camera module. Testing the liquid lens in operation with the camera module can include using a computer to model an effect of temperature change on an optical property of the liquid lens. Heating the camera module can include operating the camera module to produce heat. Heating the camera module can include applying heat to the camera module from an external source.

Determining the relationship between the optical property and the temperature of the camera module can include recording a plurality of points, each of the plurality of points corresponding to a measurement of the optical parameter at a corresponding temperature. Determining the relationship can include fitting a curve to the plurality of points. Setting the physical parameter of the liquid lens can include setting a thickness of a window element of the liquid lens. Setting the physical parameter of the liquid lens can include setting a shape of a window element of the liquid lens. Setting the physical parameter of the liquid lens can include setting an elasticity of a flexible member of the liquid lens. Setting the physical parameter of the liquid lens can include setting a thickness of an insulating layer of the liquid lens. Setting the physical parameter of the liquid lens can include setting a height of a cavity of the liquid lens. The optical property can include focal length. The optical property can include optical power.

Some embodiments can relate to a method for designing a liquid lens assembly. The method can include heating a liquid lens assembly, monitoring an optical property of the liquid lens assembly during the heating of the liquid lens assembly, determining a relationship between the optical property and the temperature of the liquid lens assembly, and setting a liquid lens assembly physical parameter based at least in part on the relationship between the optical property and the temperature of the liquid lens assembly.

The method can include testing the optical property of a liquid lens assembly having the physical parameter and, in some cases, can include adjusting the liquid lens assembly physical parameter based at least in part on the testing. The optical property can include a focal length or optical power of the liquid lens assembly. The liquid lens assembly physical parameter can include a configuration of a window assembly that comprises a window element and a flexible member that is configured to move the window element in response to changes in temperature of the liquid lens.

Some embodiments can relate to a method for designing a liquid lens assembly. The method can include receiving a relationship between an optical property and a temperature of the liquid lens assembly and setting a liquid lens assembly physical parameter based at least in part on the relationship between the optical property and the temperature of the liquid lens assembly.

BRIEF DESCRIPTION OF DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

Figure 1A:
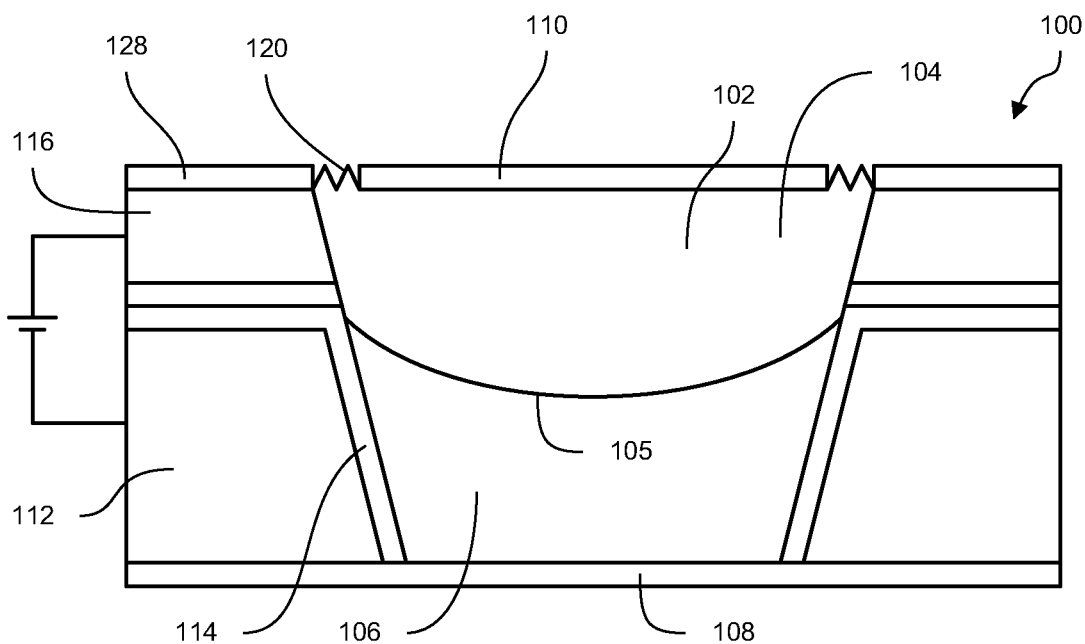
FIG. 1A is a cross-sectional view of an example embodiment of a liquid lens that includes a flexure portion.

A liquid lens can have a cavity or chamber that is configured to expand and/or contract, such as to accommodate for thermal expansion and/or contraction (e.g., of the fluids enclosed in the liquid lens). Heat applied to the liquid lens, such as by operation of a camera module associated with the liquid lens, or by ambient temperature changes, etc., can cause thermal expansion in the liquid lens, such as of one or more of the fluids contained in the cavity of the liquid lens. A liquid lens can have a window (e.g., an upper window and/or a lower window) that is configured to flex or bow, such as to alleviate pressure changes in the liquid lens. In some instances, the curvature of the flexed window can change the optical power of the liquid lens, which can defocus an image produced using the liquid lens. By way of example, in some implementations portions of the window can deflect (e.g., in a non-spherical manner) by 30 microns, and the flexing of the window can change the optical power by several diopters. Also, the flexing of the window can introduce optical aberration (such as spherical and non-spherical aberration) to an image produced using the liquid lens. In some cases, the flexed window can have a non-spherical curvature, an approximately Gaussian curvature, a 3rd or 4th order curvature, or an irregular curvature. Flexing of the window can cause shadowing in the image, such as when using the liquid lens optical-image-stabilization (OIS) function. Also, in some instances flexing of the window can compromise the structural integrity of the liquid lens, such as if enough heat is applied to the lens, the fluid can expand to the point that the window deflects enough to break.

In some embodiments, a liquid lens can be configured so that the window is displaced (e.g., axially along the optical axis of the liquid lens) instead of bowing to accommodate expansion or contraction, so as to reduce or avoid optical aberrations and/or defocusing in the liquid lens. The liquid lens can include a corrugated glass ring flexure, which can be integrally formed with the glass window, in some cases. Other flexure structures can be used. For example, a flexure made of metal or other material can be bonded to a glass window, such as using the room temperature bonding techniques disclosed in the '990 patent, which is incorporated by reference herein. A flexible member can be disposed radially outward or circumferentially around the outside of the window, and the flexible member can deform so that the window translates (e.g., axially along the optical axis) without flexing, or with a controlled flexing, to compensate for the expansion of the volume inside the liquid lens cavity. In some implementations, the window can flex or bow (e.g., in a spherical manner), such as by an amount less than the flexible member. The window can have areas (e.g., concentric areas) of different thicknesses and/or different materials to control the shape of curvature in the flexed window. The window can be designed so that the shape of the flexed window resulting from an amount of heat in the liquid lens produces a change in optical power that at least partially offsets a change in optical power that is produced in a camera module by a corresponding amount of heat.

Figure 1B:
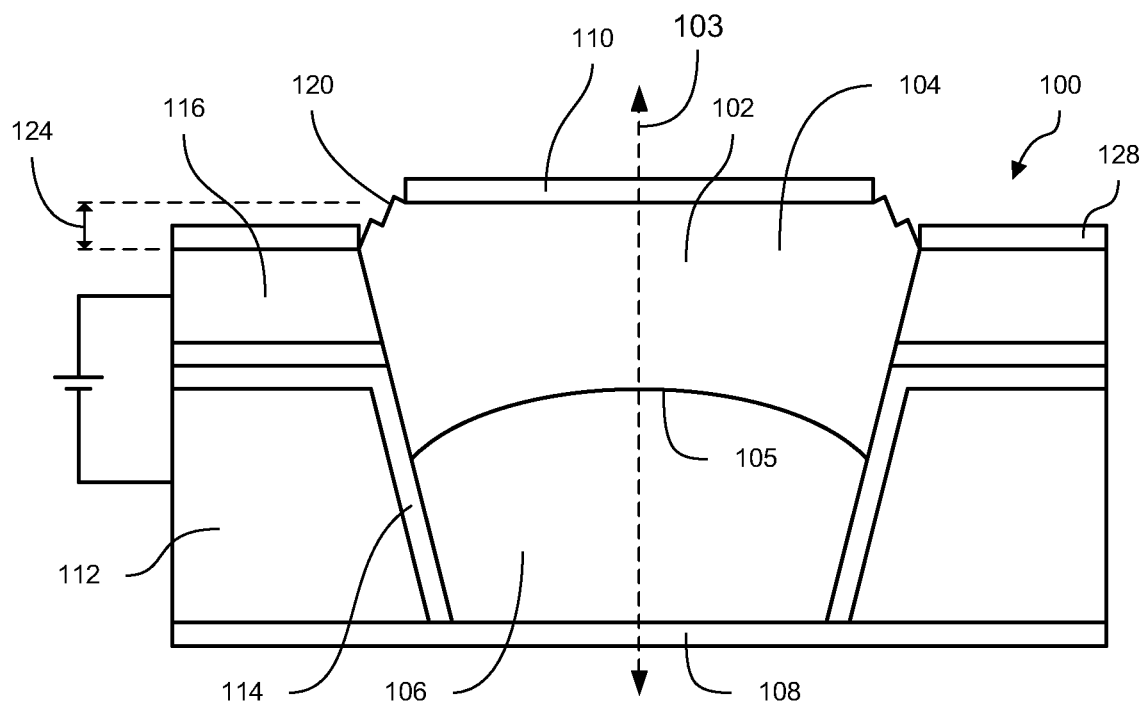
FIG. 1B is a cross-sectional view of an example embodiment of a liquid lens that includes a flexure portion in a flexed state.

FIG. 1A is a cross-sectional view of an example embodiment of a liquid lens 100. The liquid lens 100 of FIG. 1, as well as the other liquid lenses disclosed herein, can have features that are the same as or similar to the liquid lenses disclosed in the '174 patent and the '264 Publication, and can be made using techniques similar to those disclosed in the '174 patent, the '264 Publication, and the '990 patent. The liquid lens can have a cavity or chamber 102 that contains at least two substantially immiscible fluids, such as polar fluid 104 and non-polar fluid 106, forming a fluid interface 105. The two fluids 104 and 106 can be sufficiently immiscible such that the fluid interface 105, when curved, can refract light with optical power as a lens. The cavity 102 can include a portion having a shape of a frustum or truncated cone. The cavity 102 can have angled side walls. The cavity can have a narrow portion where the side walls are closer together and a wide portion where the side walls are further apart. The narrow portion can be at the bottom end of the cavity and the wide portion can be at the top end of the cavity in the orientation shown, although the liquid lenses 100 disclosed herein can be positioned at various other orientations. A lower window 108, which can include a transparent plate, can be below the cavity 102, and an upper window 110, which can include a transparent plate, can be above the cavity 102. The lower window 108 can be located at or near the narrow portion of the cavity 102, and/or the upper window 110 can be located at or near the wide portion of the cavity 102. A first one or more electrodes 112 can be insulated from the fluids in the cavity by an insulation material 114. A second one or more electrodes 116 can be in electrical communication with the polar fluid 104. The second one or more electrodes 116 can be in contact with the polar fluid 104. In some embodiments, the second one or more electrodes 116 can be capacitively coupled to the polar fluid 104. Voltages can be applied between the electrodes 112 and 116 to control the shape of the fluid interface 105 between the fluids 104 and 106, such as to vary the focal length of the liquid lens. For example, FIG. 1A shows a liquid lens 100 with the fluid interface 105 at a first position (e.g., which can be a resting position corresponding to no driving voltage), and FIG. 1B shows a liquid lens 100 with the fluid interface 105 at a second position (e.g., which can correspond to a first driving voltage value). The liquid lens 100 can produce different amounts of optical power by varying the driving voltage.

The liquid lens 100 can include a flexure or flexible member 120 that can be configured to deform to enable the window 110 to move (e.g., axially along the axis of symmetry and/or the optical axis 103 of the liquid lens 100), as can be seen in FIG. 1B. In the embodiment of FIG. 1B, the window 110 has been pushed axially outward by a distance 124. For example, if heat is applied to the liquid lens 100, components of the liquid lens 100 (e.g., one or both of the fluids 104 and 106) can expand (e.g., due to thermal expansion), which can push the upper window 110 to be displaced axially outwardly by the distance 124. If less heat were applied, the window 110 would deflect by a smaller distance, and if more heat were applied, the window 110 would deflect by a larger distance.

The flexure or flexible member 120 can be positioned at the edges of the cavity 102, at the perimeter of the upper window 110, and/or radially outward from the upper window 110. The flexible member 120 can be rotationally symmetrical about the optical axis of the liquid lens. The flexible member 120 can extend a full 360 degrees and can surround the upper window 110. In some embodiments, the flexible member 120 can be made of the same material as the upper window 110 (e.g., a glass material). The flexible member 120 can have a thickness that is less than the thickness of the window 110 to enable the flexible member 120 to deform as discussed herein. For example, the flexible member 120 can have a thickness that is 70%, 60%, 50%, 40%, 30%, 20%, or 10% of the thickness of the window 110, or any values therebetween, or any range bounded by any two of these values, although other values outside these ranges could be used in some implementations.

Figure 2A:
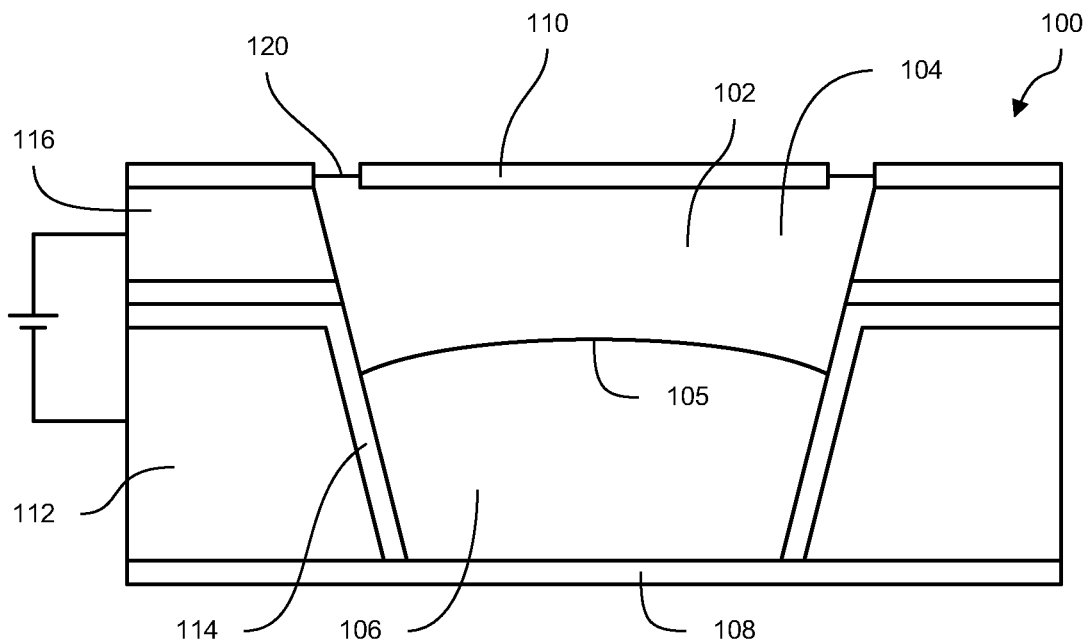
FIG. 2A is a cross-sectional view of an example embodiment of a liquid lens that includes a flexure portion.
Figure 2B:
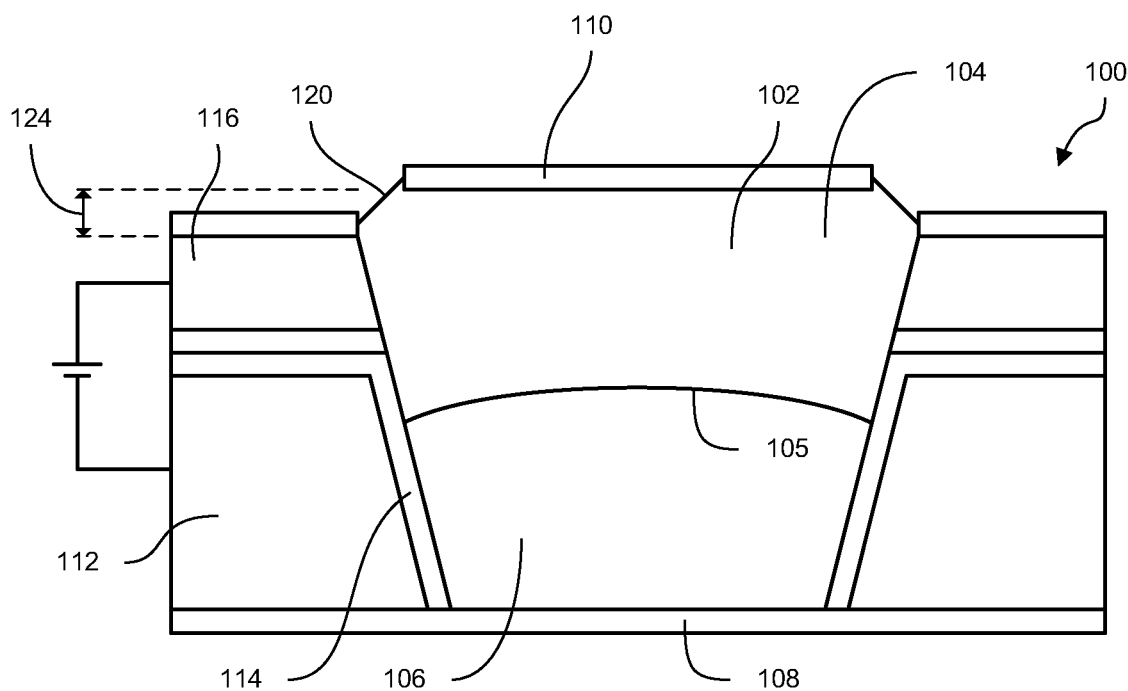
FIG. 2B is a cross-sectional view of an example embodiment of a liquid lens that includes a flexure portion in a flexed state.

The flexible member 120 can have one or more undulations, as can be seen in FIGS. 1A and 1B, which can facilitate deformation of the flexure 120 to displace the upper window 110. Some implementations of the flexible member can have one, two, three, four, five, or more undulations. In some embodiments, the flexible member 120 does not have undulations, as can be seen in FIGS. 2A and 2B. In some embodiments, the flexible member 120 is a flexible area disposed directly adjacent the radially outer edge of the window 110. In some embodiments, the flexure or flexible member 120 can be an outer portion of the window 110 that is thinner than an inner portion of the window 110.

The flexible member 120 can serve as a baffle to reduce the amount of stray light that enters the liquid lens 100 and/or that reaches a sensor of a corresponding camera module. The flexible member 120 can reflect stray light, absorb stray light, diffuse stray light, direct stray light along a path that would not impinge on the sensor, etc.

In some embodiments, the upper window 110 remains substantially planar when it is displaced, for example such that the optical power of the liquid lens 100 is substantially not changed by the shape of the displaced upper window 110. In some embodiments, the liquid lens 110 can be configured such that a temperature change from 20 degrees C. to 60 degrees C. produces a change of optical power of 5 diopters, 4 diopters, 3 diopters, 2 diopters, 1 diopter, 0.5 diopters, 0.25 diopters, or less, or any values therebetween, or any ranges bounded by any combination of these values, although other values can be used in some instances. The upper window 110 can have a diameter of 20 mm, 15 mm, 12 mm, 10 mm, 8 mm, 6 mm, 5 mm, 4 mm, 3 mm, 2 mm, or less, or any values therebetween, or any ranges bounded by any combination of these values, although other sizes can be used in some implementations.

Figure 3:
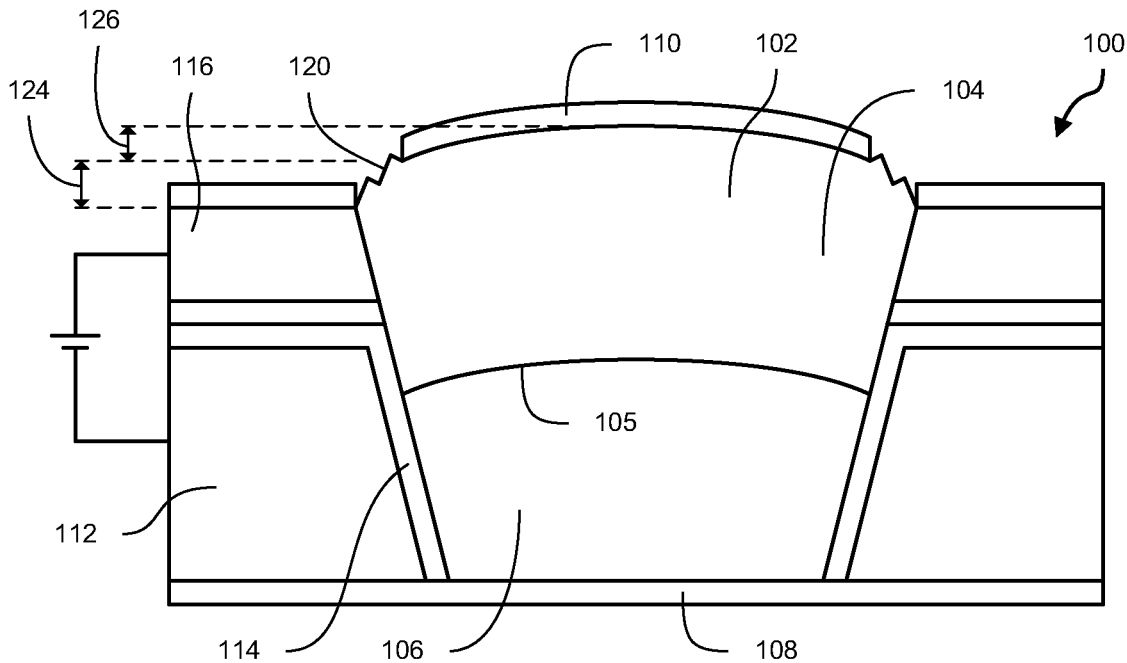
FIG. 3 is a cross-sectional view of an example embodiment of a liquid lens that includes a flexure portion in a flexed state.

With reference to FIG. 3, in some embodiments, the window 110 can be configured to flex as well as the flexure or flexible member 120. The window 110 can be less flexible than the flexible member 120. When flexed, the axial displacement distance 124 from the flexible member 120 can be greater than the axial displacement distance 126 of the flexed window 110. The ratio of the axial displacement distance 124 from the flexure 120 to the axial displacement distance 126 from the window 110 can be 1 to 1, 1.5 to 1, 2 to 1, 2.5 to 1, 3 to 1, 4 to 1, 5 to 1, 6 to 1, 8 to 1, 10 to 1, 12 to 1, or any values therebetween, or any ranges bounded by any combination of these ratios, although some embodiments can produce other ratios as well. The ratio of the total axial displacement distance (e.g., the sum of distances 124 and 126) to the axial displacement distance 126 bending of the window 110 can be 2 to 1, 2.5 to 1, 3 to 1, 4 to 1, 5 to 1, 6 to 1, 8 to 1, 10 to 1, 12 to 1, 15 to 1, or any values therebetween, or any ranges bounded by any combination of these ratios, although some embodiments can produce other ratios as well. The bending of the flexure 120 (e.g., distance 124) can produce 50%, 60%, 70%, 80%, 85%, 90%, 93%, 95%, 96%, 97%, 98%, or 99% of the total window displacement (e.g., distance 124 plus distance 126), such as in the axial direction, or any values therebetween, or any ranges bounded by any combination of these values, although other implementations are also possible.

In some embodiments, the flexible member 120 and/or the window 110 can be configured so that the curvature of the window 110 is substantially spherical, or is substantially paraboloidal, or has a third or second order curvature shape. Other curvature shapes are possible for the flexed window 110. The flexible member 120 and/or the window 110 can be configured so that the window 110 can be displaced (e.g., flex in some embodiments) without introducing substantial spherical aberration, and in some cases without introducing substantial optical aberration, to images produced by the liquid lens. The liquid lens 100, when operated between 20 degrees C. and 60 degrees C., can produce wavefront error of 1 micron, 0.7 microns, 0.5 microns, 0.4 microns, 0.3 microns, 0.2 microns, 0.1 microns, or less, or any values therebetween, or any ranges bounded by any combination of these values, although other values are also possible in some embodiments.

Figure 4:
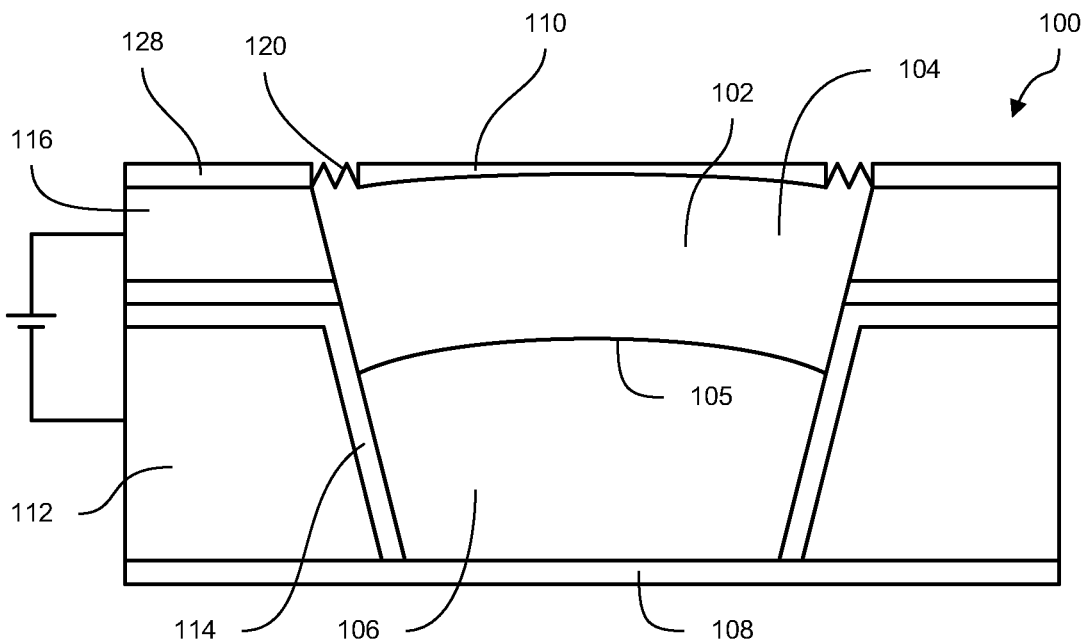
FIG. 4 is a cross-sectional view of an example embodiment of a liquid lens that includes a flexure portion.
Figure 5:
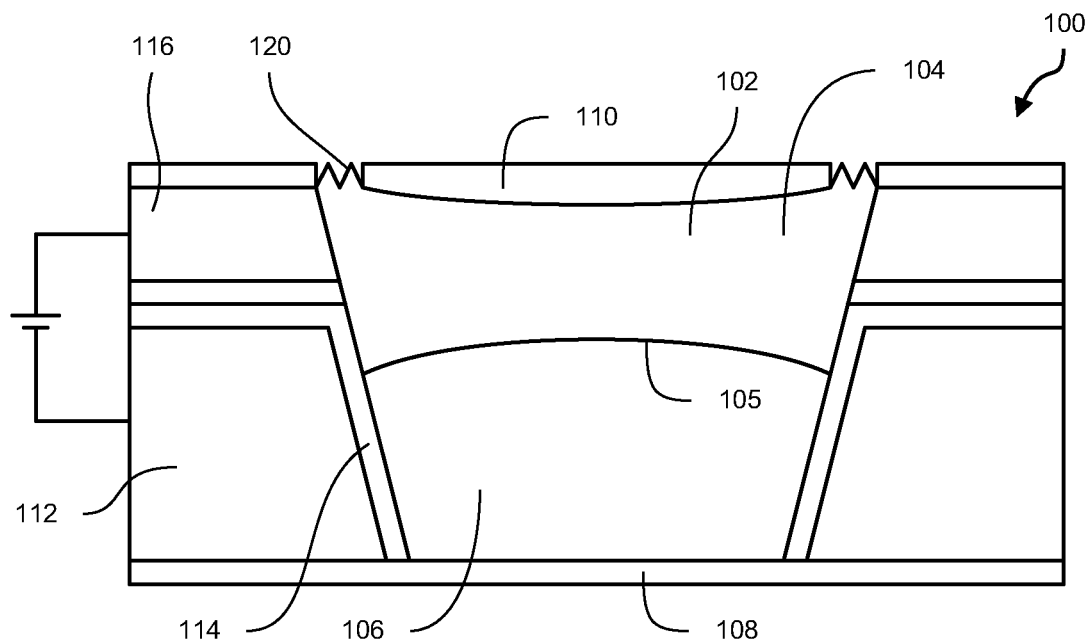
FIG. 5 is a cross-sectional view of an example embodiment of a liquid lens that includes a flexure portion.
Figure 6:
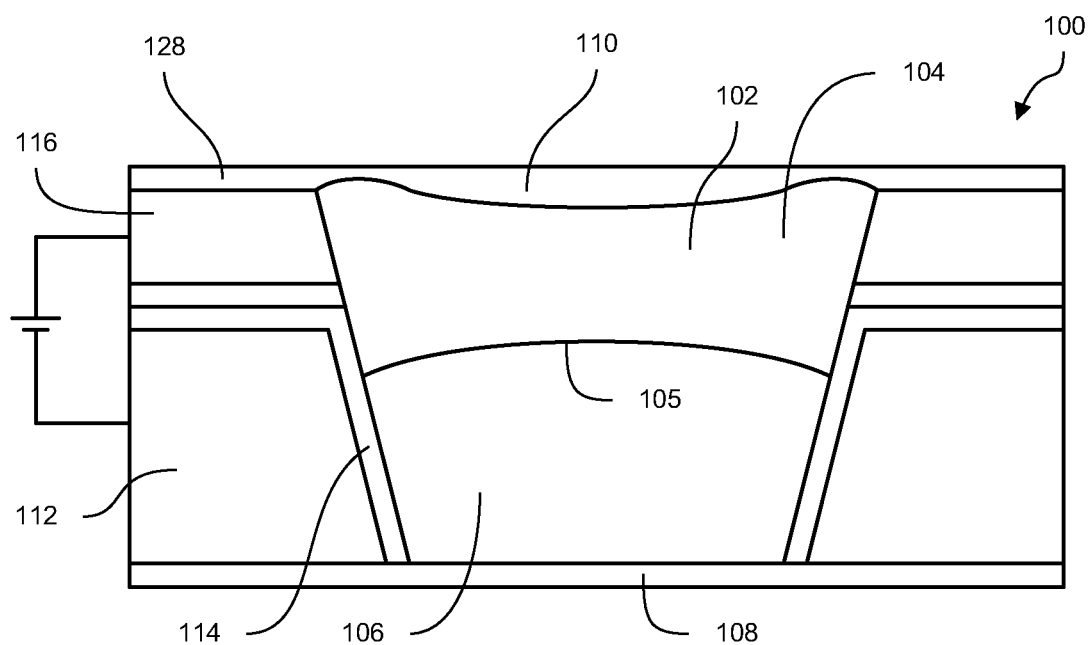
FIG. 6 is a cross-sectional view of an example embodiment of a liquid lens that includes a flexure portion.

With reference to FIG. 4, the liquid lens 100 can have a shaped window 110. The window 110 can have areas (e.g., concentric areas) of different thicknesses and/or of different materials selected such that the window 110 takes a particular shape when flexed (e.g., substantially spherical, substantial paraboloidal, etc.). The window 110 can have areas of continuously changing thickness. One or both surfaces of the window 110 can be curved when at rest. In the embodiment of FIG. 4, the window is plano-concave, having a substantially planar top or outer surface and a concave bottom or inner surface. This configuration can cause the window 110 to flex more at the thinner center area and to flex less at the thicker outer area. Many variations are possible. The window 110 can be plano-convex, for example having a substantially planar top or outer surface and a convex bottom or inner surface, as shown in FIG. 5. A plano-convex window 110 can cause the thicker center portion to flex less than the thinner outer portions of the window 110. In some cases, a top or outer surface that is planar can reduce optical power introduced by the window 110 when not flexed, especially if the material of the window 110 has an index of refraction that is close to the index of refraction for the polar fluid 104 (e.g., such that the interface between the polar fluid and the curved bottom or inner surface of the window does not significantly refract light). In some cases, both the top or outer surface and the bottom or inner surface can be curved (e.g., having a biconcave, biconvex, or meniscus shape). Various different window shapes can be used depending on the desired flexure of the window 110. In some embodiments, the distinct flexure or flexible member 120 can be omitted, such as in the embodiment of FIG. 6. The window 110 itself can have thicknesses and/or materials configured such that the window 110 assumes the desired shape when flexed without a distinct flexible member 120.

Figure 7:
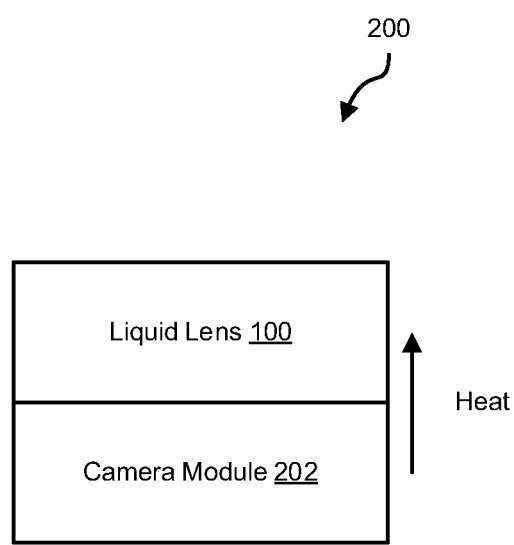
FIG. 7 shows an example embodiment of a camera system.

In some embodiments, the window 110 can flex and can introduce optical power to compensate for changes in optical power that occur in a corresponding camera module when heat is generated. FIG. 7 shows an example embodiment of a camera system 200. The camera system 200 can include a liquid lens 100, which can have features described in connection with any of the liquid lenses disclosed herein, and a camera module 202. The camera module 202 can include an imaging sensor (e.g., a charged coupled device (CCD) or complementary metal-oxide-semiconductor (CMOS) sensor), and electronic circuitry. In some embodiments, the camera module 202 can include one or more fixed lenses (e.g., a lens stack) and/or one or more movable lenses, or other focusing optical elements. In some embodiments, the liquid lens 100 can operate with the camera module to provide variable focus and/or optical image stabilization. In some embodiments, operation of the camera module 202 can generate heat, such as from the electronic circuitry and/or moving components like movable lenses. Heat generated from the camera module 202 can be transferred to the liquid lens 100, and can cause thermal expansion. The liquid lens 100 can accommodate the thermal expansion (e.g., by displacing and/or flexing the window 110), as discussed herein.

In some cases, heat from the camera module 202 can affect one or more optical properties of the camera module 202. For example, the heat can cause thermal expansion in the camera module components, such as the one or more fixed or movable lenses. As the camera module 202 operates and generates heat, the optical power of the camera module 202 can change. For example, the heat can cause thermal expansion that causes the one or more lenses to expand and/or causes mounting components to shift positions of the one or more lenses. In some cases, heat from the camera module 202 can cause the focal length of the camera module to lengthen. This can result in some defocusing of the image produced by the camera module 202. Many optical effects can result from the heat of the camera module 202. In some cases, the heat may cause the focal length of the camera module to shorten.

As mentioned above, heat from the camera module 202 can be transferred to the corresponding liquid lens 100, and can cause the window 110 to move (e.g., flex), which can affect one or more optical properties of the liquid lens 100. The optical effect of the heat from the camera module 202 transferred to the liquid lens 100 can at least in part counteract the optical effects that are produced in the camera module 202 by the heat of the camera module 202. For example, if an amount of heat in the camera module 202 causes the focal length of the one or more lenses of the camera module to lengthen, the corresponding heat transferred to the liquid lens 100 can cause the focal length of the liquid lens to shorten. If an amount of heat in the camera module 202 causes the focal length of the one or more lenses of the camera module to shorten, the corresponding heat transferred to the liquid lens 100 can cause the focal length of the liquid lens to lengthen. The liquid lens 100 can be configured such that if an amount of heat in the camera module 202 causes the optical power of the camera module to change by an amount (e.g., 1 diopter), the corresponding heat transferred to the liquid lens 100 causes the optical power of the liquid lens to change in an opposite corresponding amount (e.g., −1 diopter). In some embodiments, the optical effect of the heat in the liquid lens 100 can counter the optical effect of the corresponding heat in the camera module 202 to within a variance of 2%, 5%, 10%, 15%, 20%, 25%, 30%, 40%, or 50%, or any values therebetween, or any ranges bounded by any of these values, although values outside these ranges could be used in some implementations. For example, heat in the camera module that produces a change in optical power of 1 diopter can produce heat in the liquid lens that causes the window to move to produce a change in optical power of −0.5 diopters, −0.75 diopters, −1 diopter, −1.25 diopters, −1.5 diopters, or any values therebetween.

Figure 8:
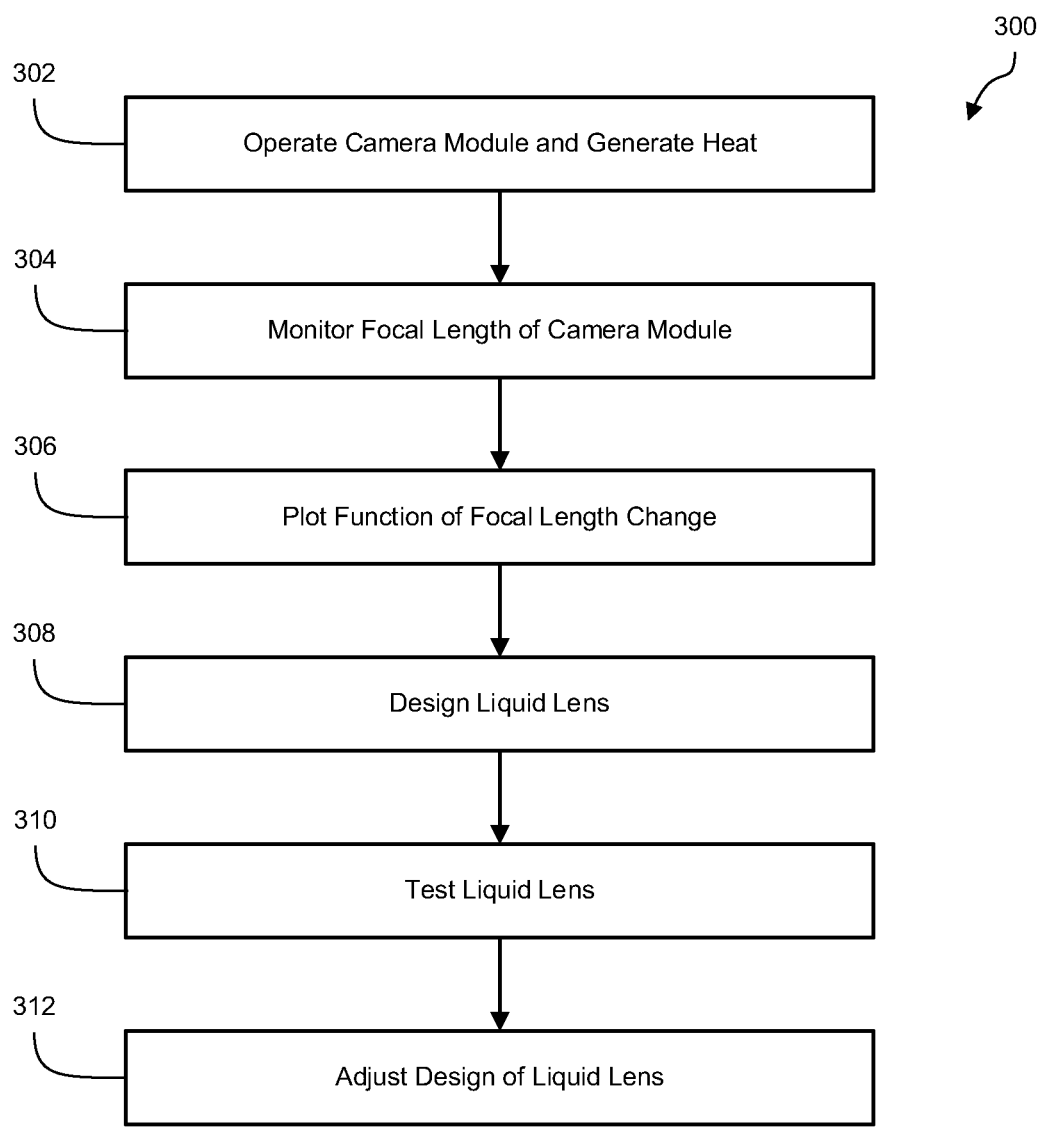
FIG. 8 is a flowchart showing an example method for designing a liquid lens.

FIG. 8 is a flowchart showing an example method 300 for designing a liquid lens 100, such as to have a window 110 that is configured to counteract optical effects produced by heat in the camera module 202. At block 302, the camera module 202 can be operated to generate heat in the camera module 202. In some embodiments, heat can be applied from an external heat source, such as to raise the ambient temperature at the camera module 202. At block 304, the focal length and/or optical power of the camera module 202 can be monitored as the temperature changes due to the generated heat. The example of FIG. 8 is provided with respect to changes in optical power or focal length, although a similar method can be applied to compensate for changes in other optical properties resulting from generated heat. At block 306, the function of the focal length or optical power changes can be plotted with respect to the changes in temperature. This can provide an indication of the desired corresponding response in the liquid lens 100.

At block 308, the liquid lens 100 can be designed. In some embodiments, various aspects of the liquid lens 100 may be constrained by application parameters, or may have been designed prior to block 308. At block 308, one or more aspects of the liquid lens 100 (e.g., the window 110 and/or the flexible member 120) can be designed to cause the liquid lens 100 to at least partially counteract the changes in optical power or focal length plotted at block 306 as heat is transferred to the liquid lens 100. In some embodiments, computer modeling can be used to design the one or more aspects of the liquid lens 100, such as to predict how particular window shapes will react to changes in temperature in the liquid lens 100. In some embodiments, the temperature in the liquid lens 100 can be different than the temperature in the camera module 202. For example, some heat may be lost to the ambient air, and the manner in which the liquid lens 100 is coupled to the camera module 202 can affect how much heat is transferred from the camera module 202 to the liquid lens 100. In some embodiments, the predicted heat transfer from the camera module 202 to the liquid lens 100 can be used to influence the design of the liquid lens 100. For example, if a relatively small amount of heat is transferred from the camera module 202 to the liquid lens 100, then the window 110 may be designed thinner in order to enable the window 110 to flex sufficiently to provide enough counteracting optical power when only the relative small amount of heat is transferred to the liquid lens 100. Computer modeling can be used to predict or estimate heat transfer from the camera module 202 to the liquid lens 100. Example parameters of the liquid lens 100 that can be adjusted to control the optical power change due to heat include the thickness of the window 110, the thickness of the flexure 120, the number of undulations in the flexure 120, the size (e.g., diameter) of the window 110, the size of the cavity 102, the material used for the window 110 and/or the flexure 120, and other features of the liquid lenses 100 discussed herein.

At block 310, the liquid lens 100 can be tested. In some cases, a liquid lens 100 can be manufactured and physically tested. For example, the liquid lens 100 and camera module 202 can be joined, and the camera module 202 can be operated to produce heat. The focal length or optical power of the camera system 200 that includes both the camera module 202 and the liquid lens 100 can be monitored as heat is generated and the temperature rises. At block 312, the design of the liquid lens 100 can optionally be adjusted, such as in view of the results of the testing at block 310. If the focal length or optical power of the camera system 200 changes more than desired as heat is generated by the camera module, the design of the liquid lens 100 can be adjusted to better counteract the optical effects of the heat in the camera module. In some embodiments, the liquid lens 100 can be tested at block 310 without the camera module 202. Heat can be applied to the liquid lens and the changes in optical power or focal length can be monitored and compared to the changes in optical power of focal length in the camera module 202. In some embodiments, the liquid lens 310 can be tested using computer modeling, rather than by empirically testing a manufactured sample. Various blocks of the method 300 can be repeated. For example, multiple rounds of liquid lens testing (block 310) and liquid lens design adjustments (block 312) can be performed. In some embodiments, adjustments can be made to the camera module 202 as well or instead, and/or adjustments can be made to the mounting mechanism for coupling the liquid lens 101 to the camera module 202 (e.g., to increase or decrease the amount of heat transferred to the liquid lens 100). In some embodiments, multiple camera modules 202 and liquid lenses 100 can be tested, such as to improve accuracy of the testing. For example, blocks 302 and 304 can be performed multiple times (e.g., 20, 50, 100 times, or more) and the plot of block 306 can combine (e.g., average) the various results. Similarly, multiple liquid lenses can be manufactured and tested, such as to improve accuracy of the testing.

Many variations are possible. For example, the method can skip plotting the function of change in the focal length or optical power at block 306. A computer modeling program can use the data from testing the camera module 202 to design a recommended liquid lens or to produce design parameters without generating the plot at block 306. In some embodiments, block 312 can be skipped, such as if no adjustment is needed. In some embodiments, all the testing and design can be performed using computer modeling.

Figure 9:
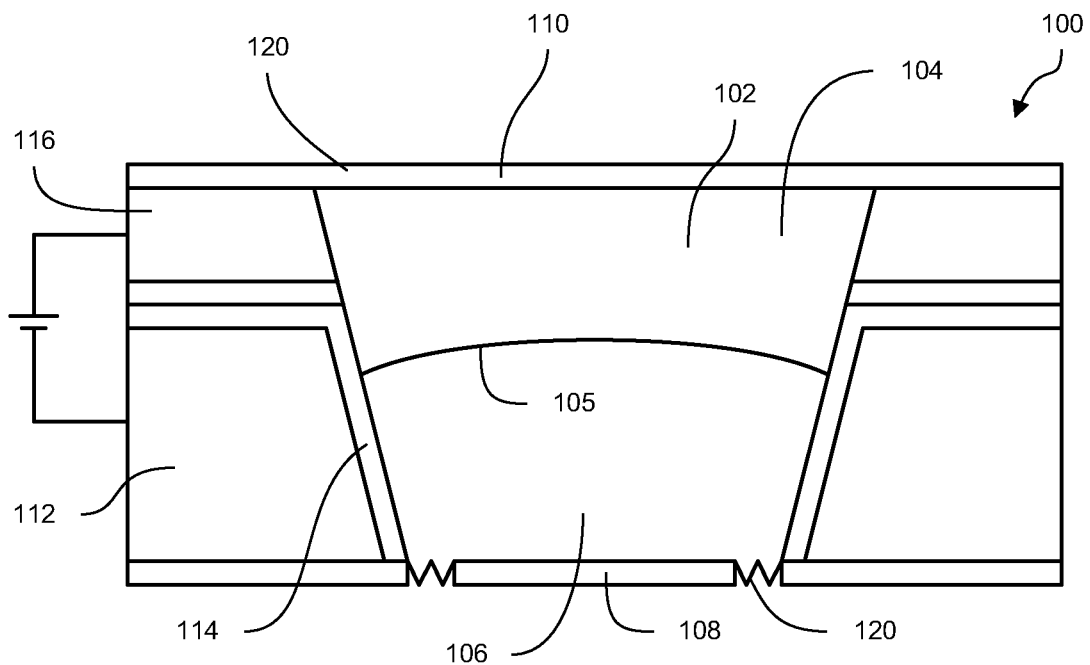
FIG. 9 is a cross-sectional view of an example embodiment of a liquid lens that includes a flexure portion.
Figure 10:
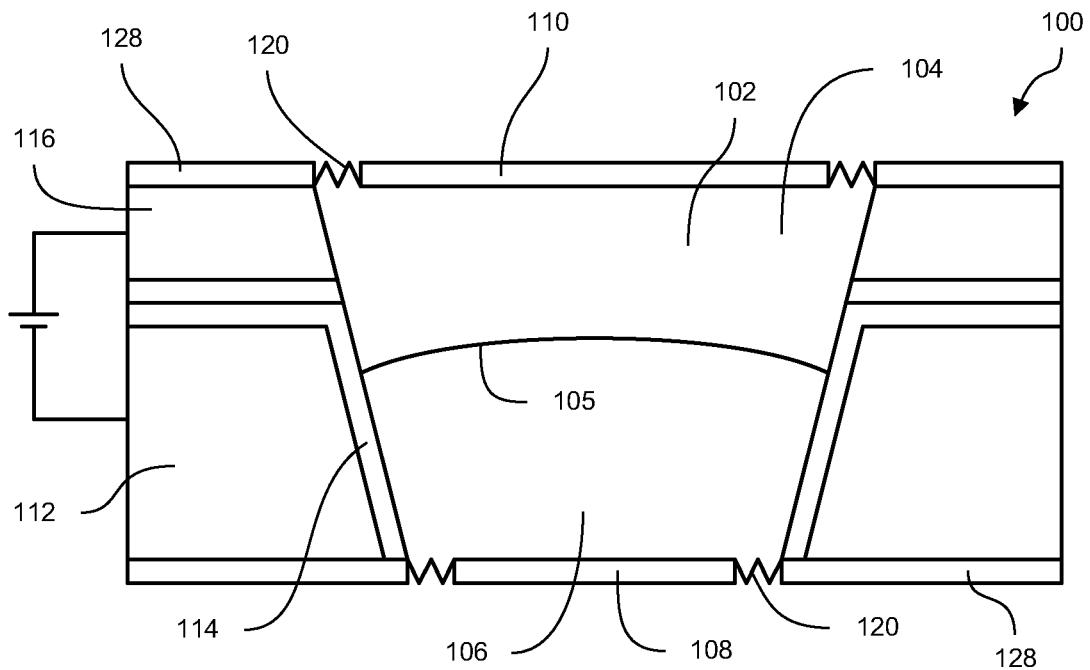
FIG. 10 is a cross-sectional view of an example embodiment of a liquid lens that includes a flexure portion.

Although various embodiments are discussed herein as relating to the upper window 110, these features can also be applied to the lower window 108. In some embodiments, either or both of the upper window 110 and lower window 108 can have a flexure or flexible member 120 and/or can be configured to flex, as disclosed herein. FIG. 9 shows an example embodiment of a liquid lens 100 having a lower window 108 (e.g., at or near the narrow end of the cavity 102) that is coupled to a flexure 120 so that the lower window 108 can be displaced (e.g., axially downward) to accommodate thermal expansion due to heat. FIG. 10 shows an example embodiment of a liquid lens 100 having flexures 120 for both the upper window 110 and the lower window 108, so that both windows 108 and 110 can be displaced (e.g., axially) to accommodate thermal expansion (e.g., of the fluids 104 and 106). The lower window 108 and upper window 110 can be configured to move in opposite directions in response to changes in temperature. The lower window 108 and upper window 110 can be configured to move by the same amount or by different amounts in response to changes in temperature. The lower window 108 can move (e.g., axially) a distance that is 50%, 60%, 70%, 80%, 90%, 100%, 110%, 120%, 130%, 140%, or 150% of the distance that the upper window 110 moves (e.g., axially) in response to a change in temperature. The distance that the windows 108 and/or 110 move can be measured at the most displaced portion of the windows 108 and/or 110 (e.g., at the apex of the bowing window shape). The various features, parameters, methods, etc. discussed herein can be implemented with a flexure 120 for only the upper window 110, with a flexure for only the lower window 108, or with flexures 120 for both the upper window 110 and the lower window 108. Also, although various embodiments are discussed in connection with increasing the volume of the cavity or chamber 102 to accommodate thermal expansion, the liquid lenses 100 discussed herein can be configured to decrease the volume of the cavity or chamber 102 to accommodate thermal contraction (e.g., due to cooling temperatures). For example, the window 110 can be displaced (e.g., axially) towards the fluid interface 105 or into the cavity 102, which can reduce the volume of the cavity 102. The window 110 can also bow inwardly towards the fluid interface 105 to reduce the volume of the chamber or cavity 102.

Figure 11:
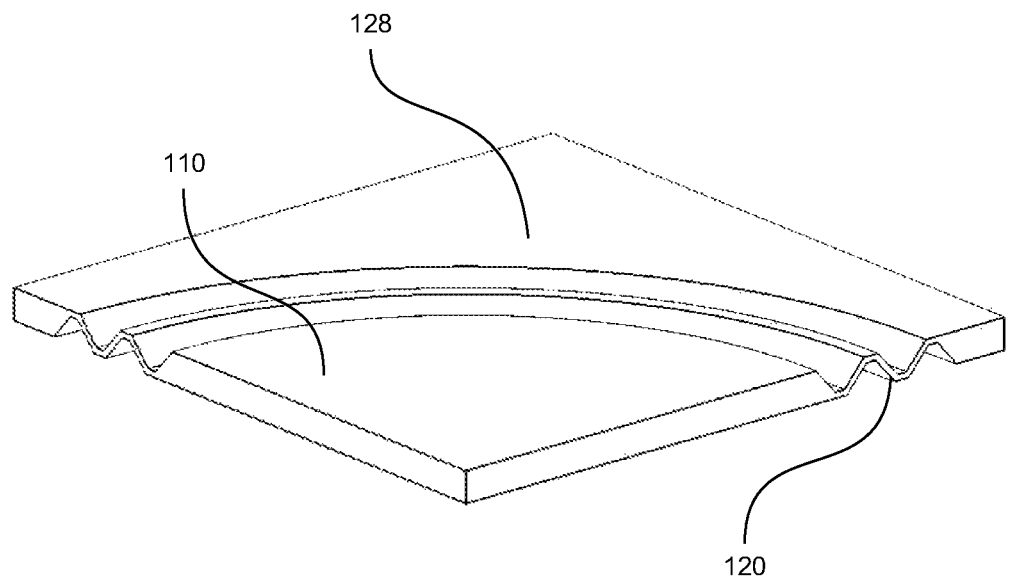
FIG. 11 shows a quarter of an example embodiment of a window element for a liquid lens.
Figure 12:
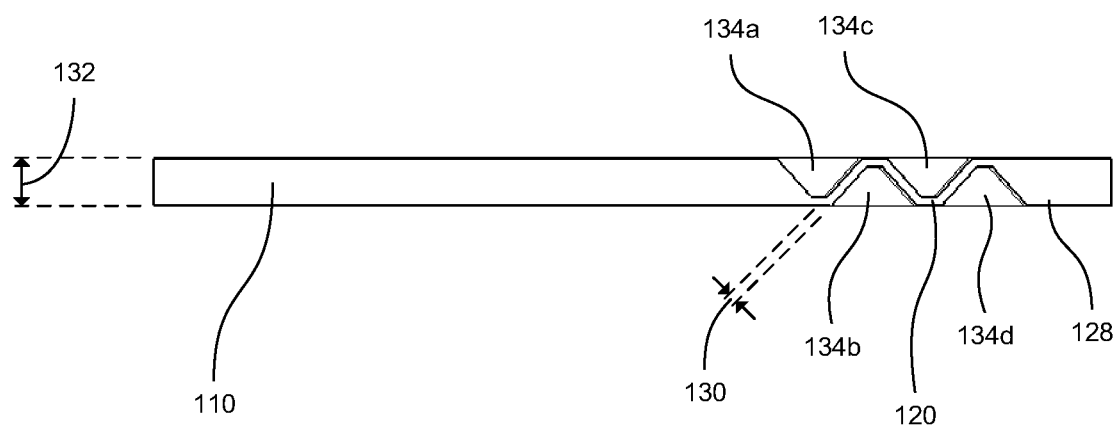
FIG. 12 shows a cross-sectional view of an example embodiment of a quarter of a window element for a liquid lens.
Figure 13:
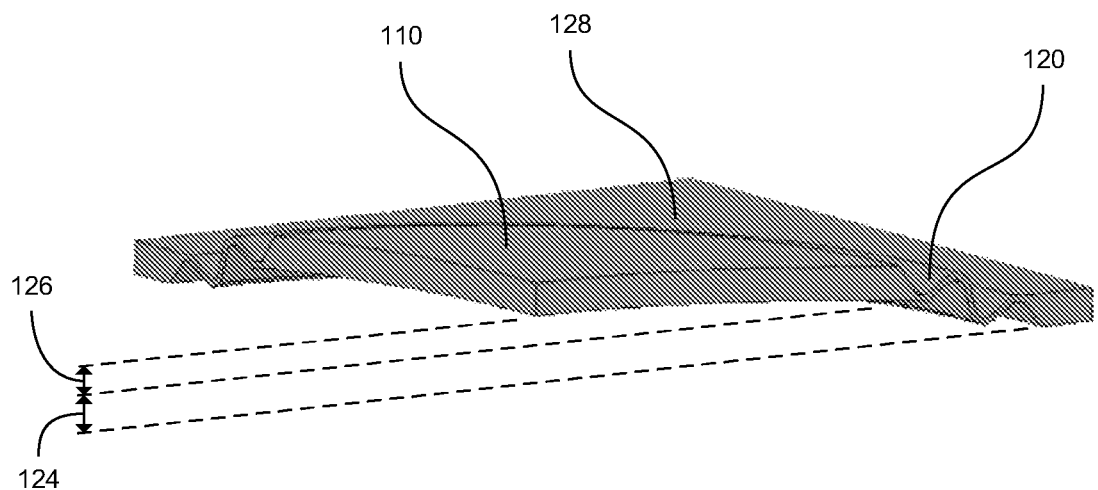
FIG. 13 shows a quarter of an example embodiment of a window element for a liquid lens in a flexed state.

FIG. 11 is a partial perspective view of a liquid lens window element. FIG. 12 is a cross-sectional view of the liquid lens window element. FIG. 13 is a partial perspective view of the liquid lens window element in a flexed configuration. In FIGS. 11-13, one quarter of the window element is shown. The window element embodiments disclosed herein can be used for the upper window 110 and/or the lower window 108, but are generally discussed in connection with the upper window 110 for simplicity of discussion. The window element can include a transparent window 110, a flexure 120, and an attachment portion 128. The transparent window 110 can be located at a center region, with the flexure 120 positioned radially outward from the transparent window 110, and/or with the attachment portion 128 positioned radially outward from the flexure 120. The attachment portion 128 can be located at the periphery of the window element. The attachment portion 128 can be attached to a substrate or other underlying support structure or material (e.g., using a room temperature bonding technique as disclosed in the '990 patent, or an adhesive, or a fastener, or any other suitable manner) to position the window element on the liquid lens 100, as can be seen in FIGS. 1A to 6, for example. The flexure 120 can couple the attachment portion 128 to the transparent window 110. The flexure 120 can be more flexible than the transparent window 110 and/or more flexible than the attachment portion 128. The flexure 120 can be thinner than the transparent window 110 and/or thinner than the attachment portion 128. For example, the material of the flexure 120 can have a thickness 130 that is 5%, 10%, 15%, 20%, 25%, 30%, 35%, 40%, 45%, 50%, 55%, 60%, 65%, 70%, or 75% of the thickness 132 of either or both of the transparent window 110 and the attachment portion 128, or any values therebetween, or any ranged bounded by any combination of these values, although other values could also be used in some implementations. In some cases, the transparent window 110 and the attachment portion 128 can have the same thickness, or either can have a thickness that is thicker or thinner than the other by 5%, 10%, 15%, 20%, 25%, 30%, or any values therebetween, or any ranges bounded by any combination of these values.

The flexure 120 can be integrally formed of the same material (e.g., a glass material) as the transparent window 110 and/or the attachment portion 128, for example as one integral piece. Various types of transparent materials can be used, such as glass, ceramic, glass-ceramic, or polymeric materials. For example, the transparent material can include silicate glass (e.g., aluminosilicate glass, borosilicate glass), quartz, acrylic (e.g., Poly(methyl methacrylate) (PMMA), polycarbonate, etc. The window element can be formed from a piece (e.g., a plate) of transparent material (e.g., glass) having a thickness 132. Material can be removed to form the thinner region (e.g., having a thickness of 130) of the flexure 120. Etching, photolithography, laser ablation, milling, computer numerical control (CNC) milling, or any other suitable technique can be used. Surprisingly, it was discovered that the thin glass flexure 120 can bend without breaking, as shown for example in FIG. 13, even though glass is generally a brittle material.

The flexure 120 can be a ring flexure that surrounds the window 110. One or more annular recesses 134a-d can be formed in the material. The recesses 134a-d can extend a full 360 degrees to form a closed shape, such as a circle, although other shapes such as an ellipse, a square, rectangle or other polygon can be used. The recesses 124a-d can be concentric, such as having the same center point, but different radii or different widths. A first recess 134a can be positioned adjacent to the transparent window 110. The radially inner edge of the recess 134a can define the outer perimeter of the transparent window 110. The recesses 134a-d can be spaced substantially equidistant from each adjacent recess in the radial direction. Moving radially outwardly, the recesses 134a-d can be located on alternating sides. By way of example, the first recess 134a can be positioned on a top side, a second recess 134b can be positioned on a bottom side, a third recess 134c can be positioned on a top side, and a fourth recess 134d can be positioned on a bottom side. The recesses 134a-d can form one or more undulations, as can be seen for example in FIG. 12. The flexure 120 can have a cross-sectional shape that includes a repeating non-linear pattern. A wall separating one recess 134a from an adjacent recess 134b (e.g., formed on the opposite side) can have a thickness 130. The recesses 134a-d can have a depth so that the material at the base of the recess has a thickness, which can be substantially the same as the thickness 130 of the wall between the adjacent recesses 134a-d. The thickness of the base and the wall can differ by 5%, 10%, 15%, 20%, 25%, or 30% in some embodiments, or any values therebetween, or any ranges bounded by any combination of these values, although other configurations are possible. The recesses 134a-d can have substantially the same cross-sectional shape, cross-sectional size, and/or depth. The recesses 134a-d can have a trapezoidal cross-sectional shape, although other shapes can be used, such as a semicircle, partial ellipse, a triangle, a square, a rectangle, or other polygonal shape. The recesses 134a-d can have the same size and shape except that the radius or width of the positions of the recesses 134a-d can vary.

Figure 14:
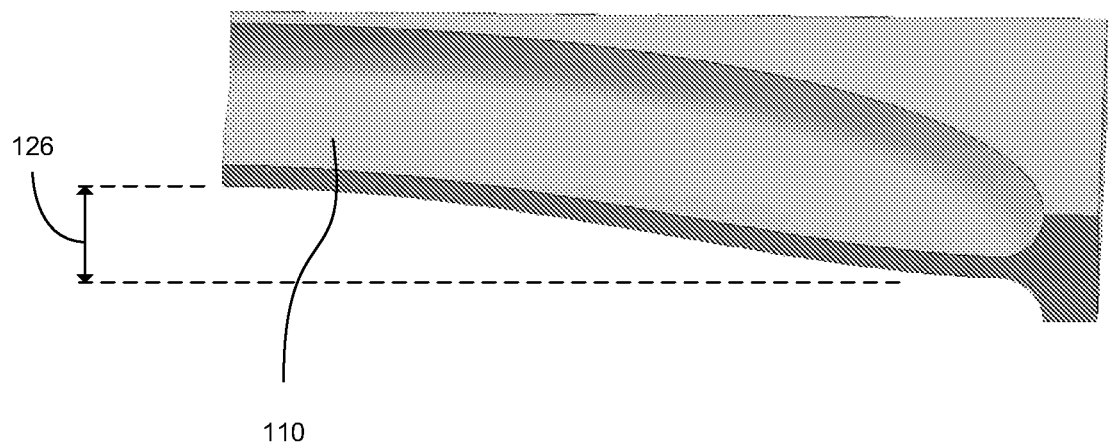
FIG. 14 shows a quarter of an example of a flexible window element for a liquid lens.

FIG. 13 shows the flexure 120 and the transparent window 110 in a flexed state, such as can be induced by thermal expansion in the liquid lens 100. Because the flexure 120 is thinner and more flexible than the transparent window 110, the flexure 120 is deformed more than the transparent window 110. The displacement distance 124 for the flexure 120 can be greater than the displacement distance 126 for the transparent window 110, as discussed herein. FIG. 14 shows an example of a liquid lens window 110 without a flexure 120. FIG. 14 shows the window 110 in a flexed position, such as to can be induced by thermal expansion in a liquid lens. The flexible window 110 can have a substantially constant thickness throughout. The axial displacement 126 of the window 110 in FIG. 13 can be significantly less than the axial displacement 126 of the window 110 in FIG. 14, because the deformation of the flexure 120 in FIG. 13 can accommodate a significant amount of the expansion. Also, the window 110 of FIG. 13 can be thicker than the window 110 of FIG. 14 (e.g., because in FIG. 14 the entire window 110 is made thinner and more flexible so that it can accommodate thermal expansion without a dedicated flexure portion 120), which can result in the window 110 of FIG. 13 deforming less. If only the axial displacement of the radially inner portion of the window 110 of FIG. 14 were considered (e.g., the portion having the same radius as the window 110 of FIG. 13), the embodiments of FIG. 13 would still have less window displacement 126. The portion of the window 110 that transmits light that reaches the optical sensor to produce an image can be less deformed in the embodiment of FIG. 13, as compared to the approach of FIG. 14. Thus, the embodiment of FIG. 13 can produce less change in optical power due to temperature changes. The window of FIG. 14 can have a generally Gaussian shape when flexed. The window of FIG. 13 can have a generally spherical or parabolic shape, which can produce less optical aberration than the Gaussian shape of FIG. 14.

Figure 15:
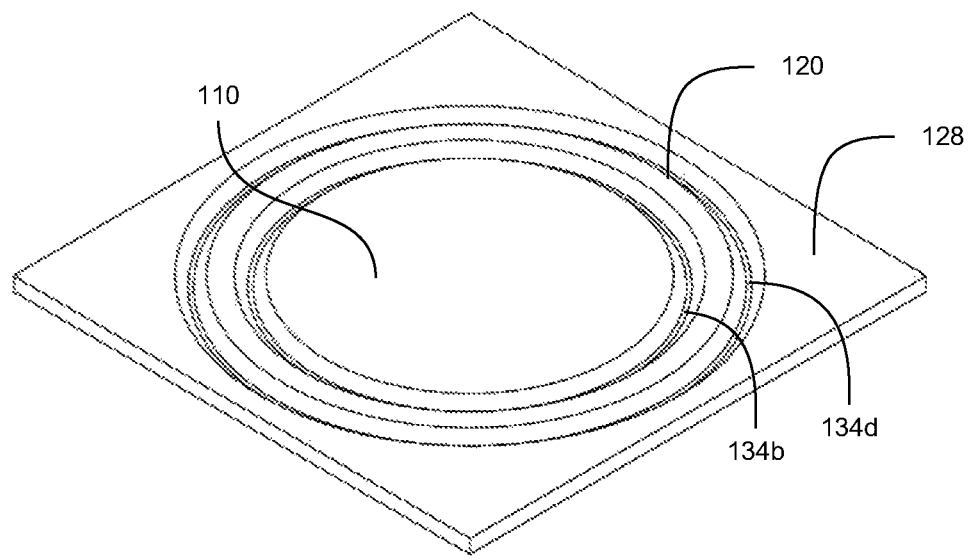
FIG. 15 shows a top perspective view of an example embodiment of a window element for a liquid lens.
Figure 16:
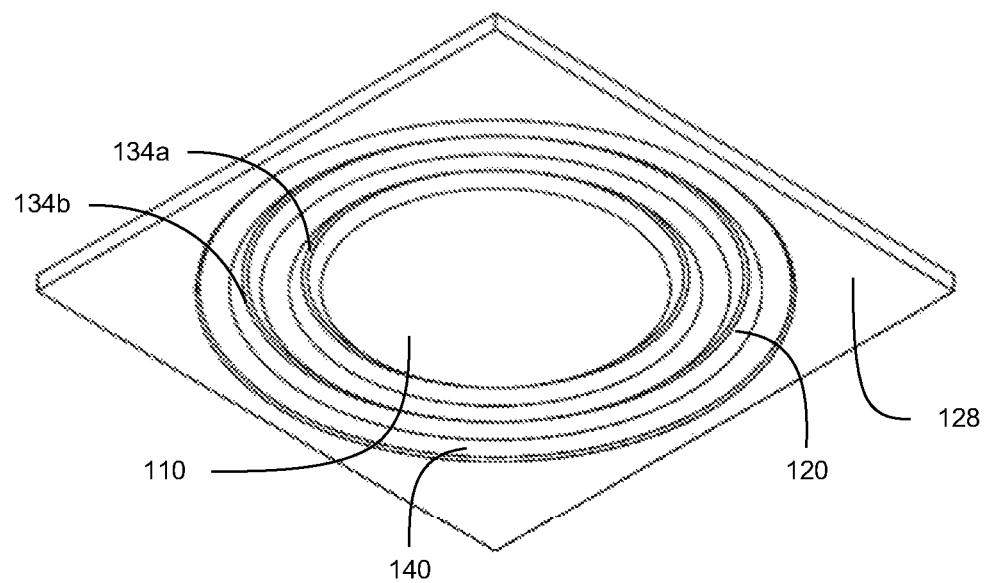
FIG. 16 is a bottom perspective view of the liquid lens window element.
Figure 17:
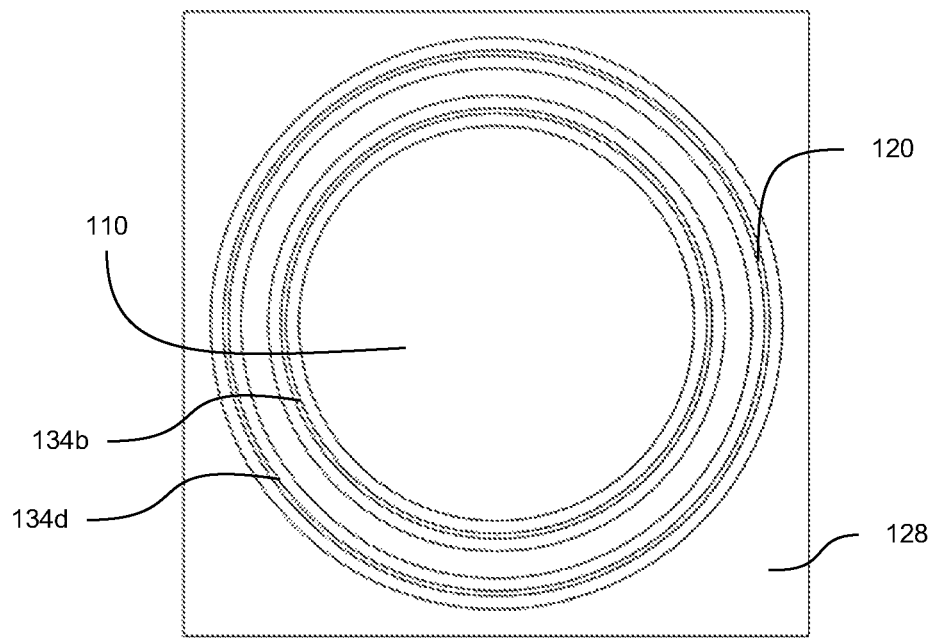
FIG. 17 is a top view of the liquid lens window element.
Figure 18:
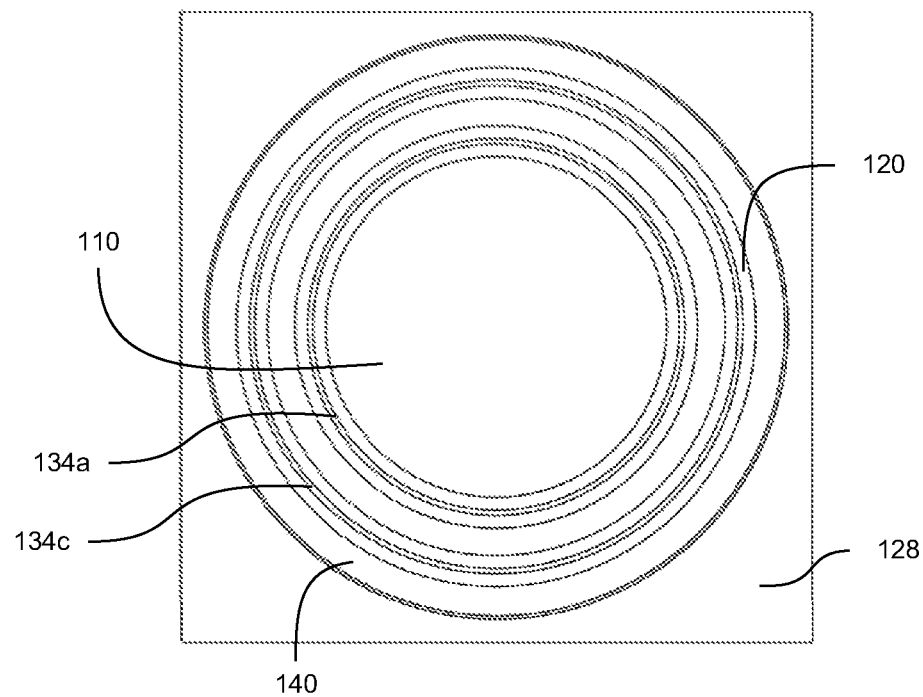
FIG. 18 is a bottom view of the liquid lens window element.
Figure 19:
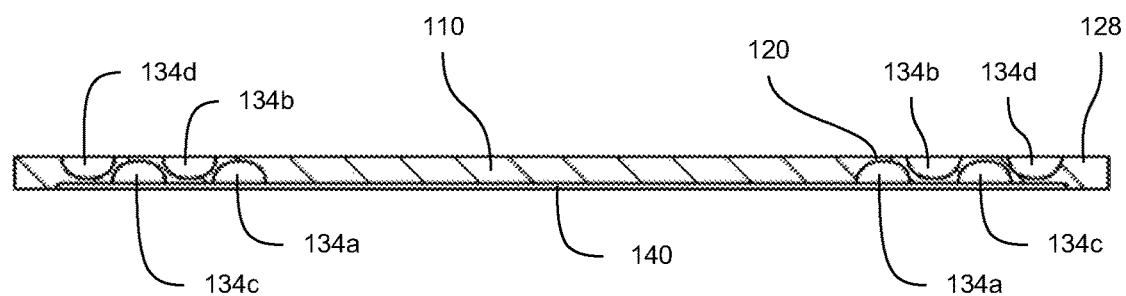
FIG. 19 is a cross-sectional view of the liquid lens window element.
Figure 20:
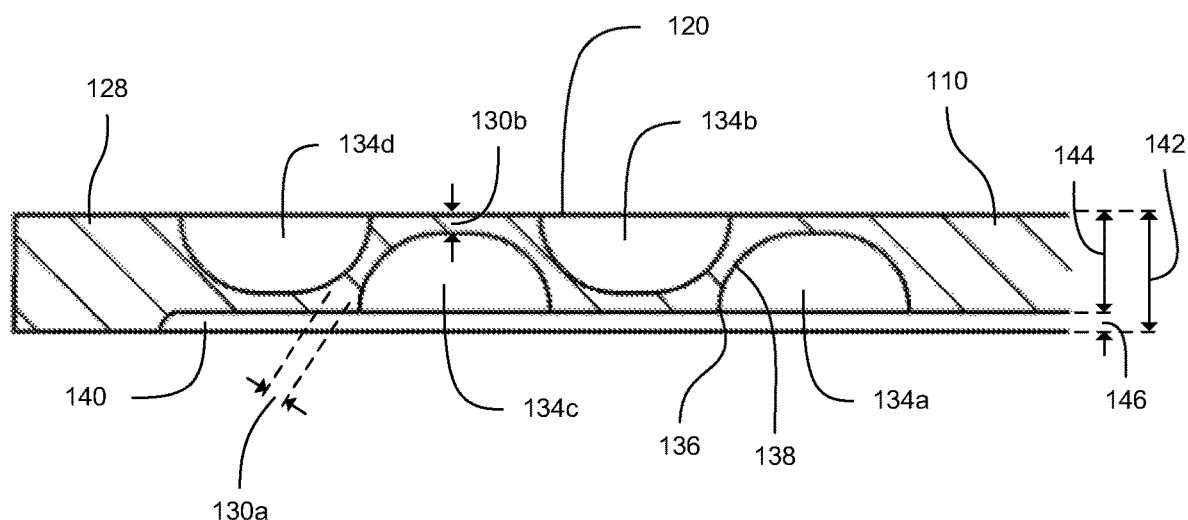
FIG. 20 is a partial cross-sectional view that includes the flexure of the liquid lens window element.
Figure 21:
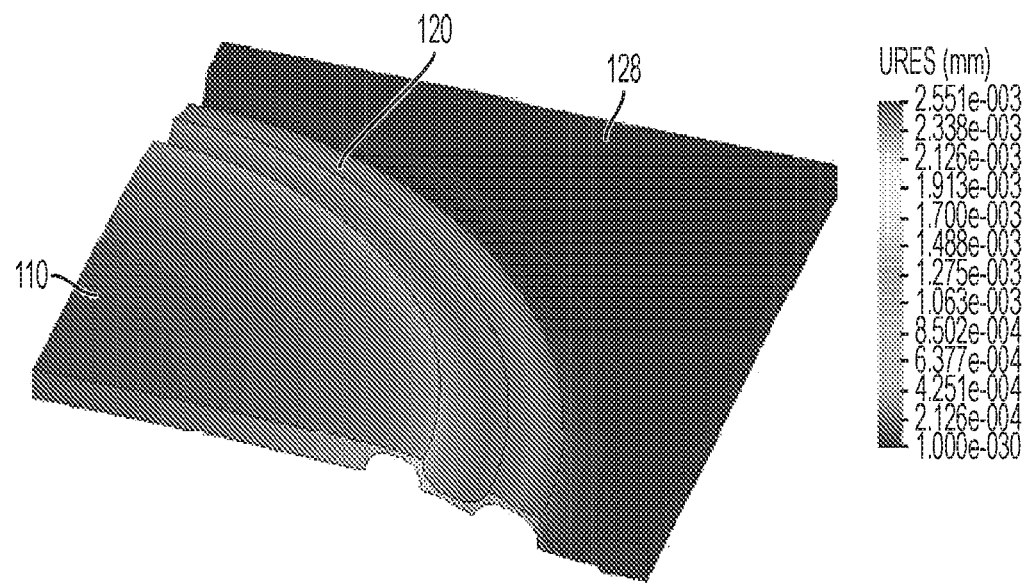
FIG. 21 shows the one quarter of the flexure and window in a flexed configuration.
Figure 22:
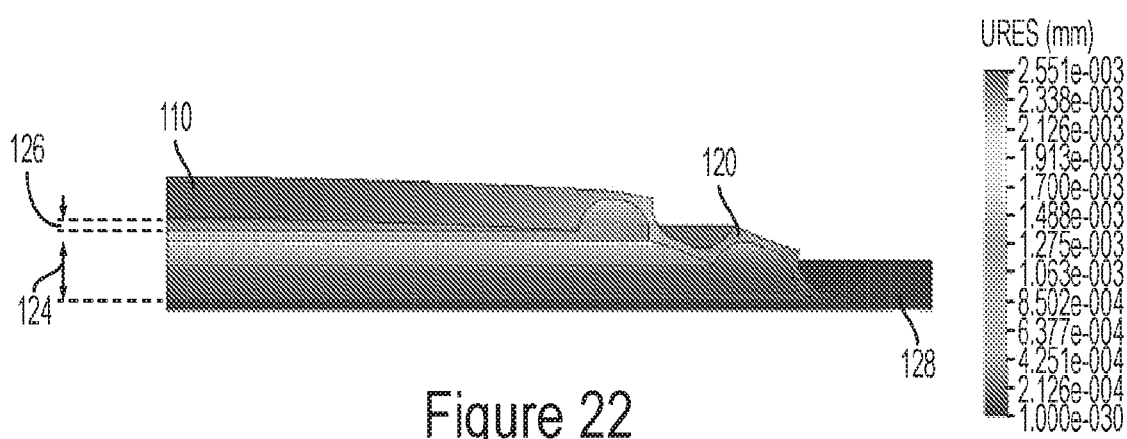
FIG. 22 also shows the one quarter of the flexure and window in a flexed configuration.

FIG. 15 is a top perspective view of an example embodiment of a liquid lens window element. FIG. 16 is a bottom perspective view of the liquid lens window element. FIG. 17 is a top view of the liquid lens window element. FIG. 18 is a bottom view of the liquid lens window element. FIG. 19 is a cross-sectional view of the liquid lens window element. FIG. 20 is a partial cross-sectional view that includes the flexure 120 of the liquid lens window element. FIGS. 21 and 22 show the one quarter of the flexure 120 and window 110 in a flexed configuration. The liquid lens window element is discussed in connection with an upper window 110 of a liquid lens 100, but a similar window element could be used as the lower window element 108 in a liquid lens 100. The window element of FIGS. 15-22 can be similar to the window element of FIGS. 11-13, and the features discussed in connection with FIGS. 11-13 can apply to the embodiment of FIGS. 15-22, although they are not repeated.

The radially inner recess 134a (e.g., the first recess 134a) can be formed on the bottom side (e.g., the side facing towards the cavity 102 in the liquid lens 100). The second recess 134b can be formed on the top side (e.g., the side facing away from cavity 102 of the liquid lens 100). The third recess 134c can be formed on the bottom side. The fourth recess 134d (e.g., the radially outward recess 134d) can be formed on the top side. The recesses 134a-d can have a semicircular cross-sectional shape. The recesses 134a-d can be formed by etching, although various other techniques can be used to form the recesses 134a-d, including those discussed herein. Because of the curved shape of the sides of the recesses 134a-d, the walls between adjacent recesses 134a-d can have a varied thickness. For example, at the edge 136 of the recess the wall between adjacent recesses can be relatively thick. At about half the depth of the recess 134a-d (e.g., at location 138 in FIG. 20), the wall between adjacent recesses can be relatively thin. The wall between adjacent recesses (e.g., between recess 134c and 134d) can have a thickness 130a at the thin portion, as shown in FIG. 20. The recesses 134a-d can have a depth such that the material at the base of the recess 134a-d can have a thickness 130b. The thickness 130a of the wall and the thickness 130b of the base can be substantially the same. The thickness 130a of the wall and the thickness 130b of the base can differ by 5%, 10%, 15%, 20%, 25%, or 30% in some embodiments, or any values therebetween, or any ranges bounded by any combination of these values, although other configurations are possible.

FIGS. 21 and 22 show the flexure 120 and the window 110 in a flexed configuration. The flexure 120 can be axially displaced more than the window 110 (e.g., measured at the apex or most displaced portion of the window). The ratio of the axial displacement distance 124 from the flexure 120 to the axial displacement distance 126 from the window 110 can be 1 to 1, 1.5 to 1, 2 to 1, 2.5 to 1, 3 to 1, 4 to 1, 5 to 1, 6 to 1, 8 to 1, 10 to 1, 12 to 1, or any values therebetween, or any ranges bounded by any combination of these ratios, although some embodiments can produce other ratios as well. The ratio of the total axial displacement distance (e.g., the sum of distances 124 and 126) to the axial displacement distance 126 of the window 110 can be 2 to 1, 2.5 to 1, 3 to 1, 4 to 1, 5 to 1, 6 to 1, 8 to 1, 10 to 1, 12 to 1, 15 to 1, or any values therebetween, or any ranges bounded by any combination of these ratios, although some embodiments can produce other ratios as well.

In some embodiments, the side of the window element facing towards the cavity 102 (e.g., the bottom side of the upper window 110) can have a depression 140. The depression 140 can extend across part or all of the flexure 120. The depression 140 can extend across part or all of the transparent window 110. The attachment portion 128 can be thicker than the window 110. The attachment portion 128 can be thicker than the height of the flexure 120 (e.g., the height of the undulations created by the recesses 134a-d). For example, the attachment portion 128 can have a thickness 142 and the window 110 can have a thickness 144, as shown in FIG. 20. The flexure 120 can have a height 144 that can be the same as the thickness of the window 110. The recess 140 can have a depth 146, as shown in FIG. 20. In some cases, the transparent window 110 and/or the height of the flexure 120 can be smaller than the thickness of the attachment portion 128 by 5%, 10%, 15%, 20%, 25%, 30%, or any values therebetween, or any ranges bounded by any combination of these values. The depression 140 can be formed before or after the recesses 134a-d. For example, the depression 140 can be formed on one side of a glass plate (e.g., using etching or any other suitable technique). The recesses 134a and 134c can be formed in the base of the depression 140 (e.g., using etching or any other suitable technique). The recesses 134b and 134d can be formed on the other side of the glass plate (e.g., using etching or any other suitable technique) either before or after the depression 140 and/or the recesses 134a and 134c. In some cases, the depression 140 can be formed after the recesses 134a and 134c. For example, forming the depression 140 would reduce the depth of the recesses 134a and 134c, in some implementations.

Figure 23:
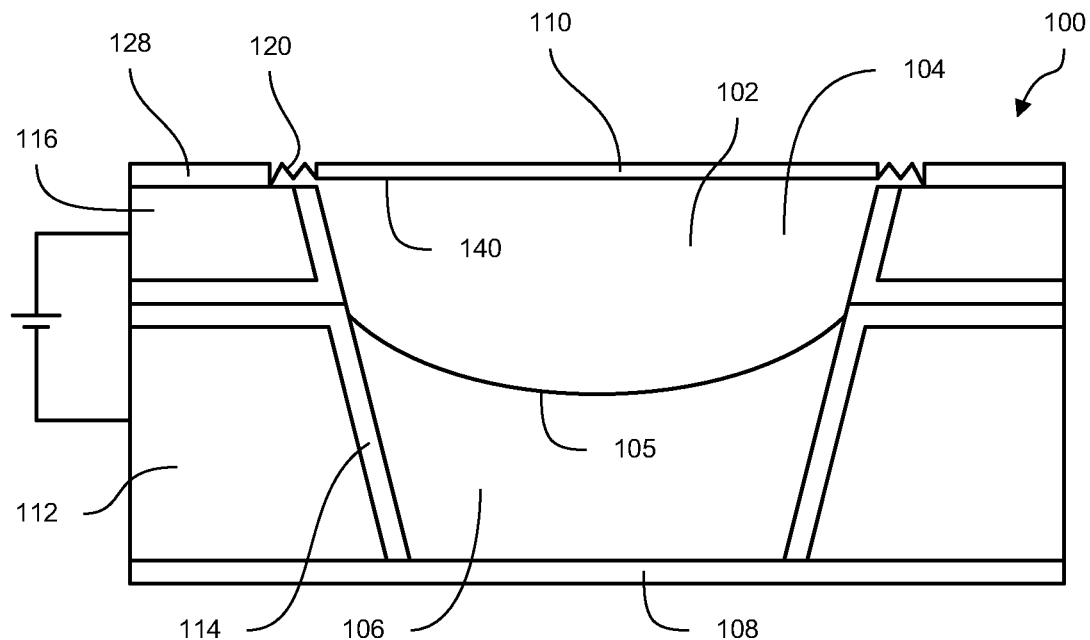
FIG. 23 shows an example embodiment of a liquid lens.

The depression 140 can produce a gap between the flexure 120 and/or the window 110 and the underlying structure of the liquid lens 100. The gap can impede the flexure 120 and/or the window 110 from contacting the underlying structure. The gap can provide an electrical connection between an electrode and fluid in the liquid lens. FIG. 23 shows and example embodiment of a liquid lens 100 that has a depression 140 on an underside of the window element for the upper window 110. The truncated cone structure can extend up to the level of the attachment portion 128 for the window element. The depression 140 can impede the flexure 120 and/or the window 110 from touching the top surface or end of the truncated cone structure. In some cases, the second electrode 116 can contact the polar fluid 104 at a location that is above the truncated cone structure, or that is on a top surface of the truncated cone structure. The second electrode 116 can contact the polar fluid 104 at a location that is directly below the flexure 120. The depression 140 can produce a gap so that the polar fluid 104 can fill the area under the flexure 120 and contact the second electrode 116. In some embodiments, some or all of the flexure 120 can be positioned radially outside the truncated cone portion of the cavity 102, as can be seen in FIG. 23.

The window element (e.g., formed from a glass plate) can have a thickness (e.g., thickness 132 in FIG. 12 or thickness 142 in FIG. 20) of 0.5 microns, 0.7 microns, 1.0 microns, 1.2 microns, 1.4 microns, 1.5 microns, 1.7 microns, 2.0 microns, 2.5 microns, 3 microns, or any values therebetween, or any ranged bounded by any combination of these values, although other sizes can be used in some embodiments (e.g., for larger scale liquid lenses). In some cases, the attachment portion 128 and/or the window 110 can have a thickness of 0.5 microns, 0.7 microns, 1.0 microns, 1.2 microns, 1.4 microns, 1.5 microns, 1.7 microns, 2.0 microns, 2.5 microns, 3 microns, or any values therebetween, or any ranged bounded by any combination of these values, although other sizes can be used in some embodiments (e.g., for larger scale liquid lenses). The window 110 can have the full thickness of the plate (e.g., the same as the thickness 142 of the attachment portion 128), or the window 110 can have a thickness 144 that is reduced by the thickness 146 of the depression 140. In some embodiments, the depression 140 can have a thickness 146 of 0.1 microns, 0.15 microns, 0.2 microns, 0.25 microns, 0.3 microns, 0.35 microns, 0.4 microns, 0.45 microns, 0.5 microns, or any values therebetween, or any ranges bounded by any combination of these values, although other sizes can also be used. The wall between adjacent recesses (e.g., between recess 134c and 134d) can have a thickness 130a of 0.1 microns, 0.15 microns, 0.2 microns, 0.25 microns, 0.3 microns, 0.35 microns, 0.4 microns, 0.45 microns, 0.5 microns, or any values therebetween, or any ranges bounded by any combination of these values, although other sizes can also be used. The base of the recess 134a-d can have a thickness 130b of 0.1 microns, 0.15 microns, 0.2 microns, 0.25 microns, 0.3 microns, 0.35 microns, 0.4 microns, 0.45 microns, 0.5 microns, or any values therebetween, or any ranges bounded by any combination of these values, although other sizes can also be used. This disclosure is contemplated as including the ratios and comparisons between the various dimensions of the various features discussed herein and/or shown in the figures.

Figure 24:
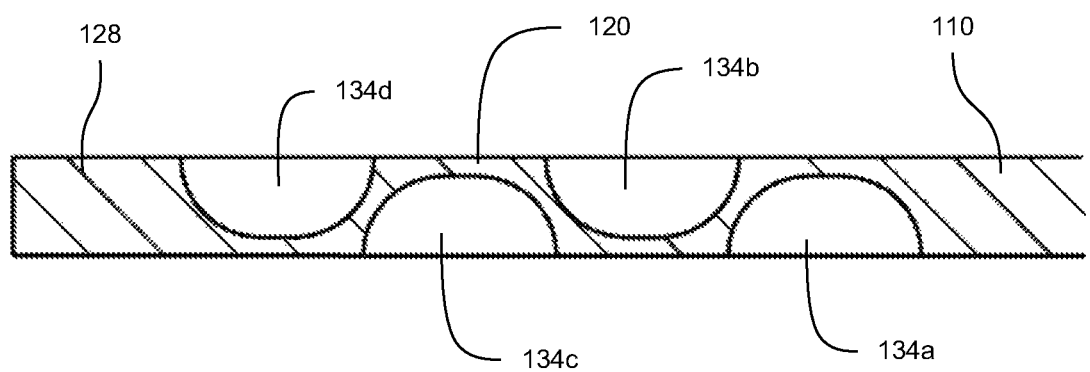
FIG. 24 shows an example embodiment of a flexure portion

Many variations are possible. For example, in some embodiments, the depression 140 can be omitted. For example, FIG. 24 shows a flexure 120 and window 110 similar to FIG. 20, but with no depression 140. The embodiment of FIG. 24 can be used with a liquid lens 100 that have a post or other raised structure for engaging the attachment portion 128. The embodiment of FIG. 24 can be used with a liquid lens 100 that has the flexure 120 suspended over the truncated cone portion of the cavity 102 (e.g., see FIGS. 1A and 1B).

Figure 25:
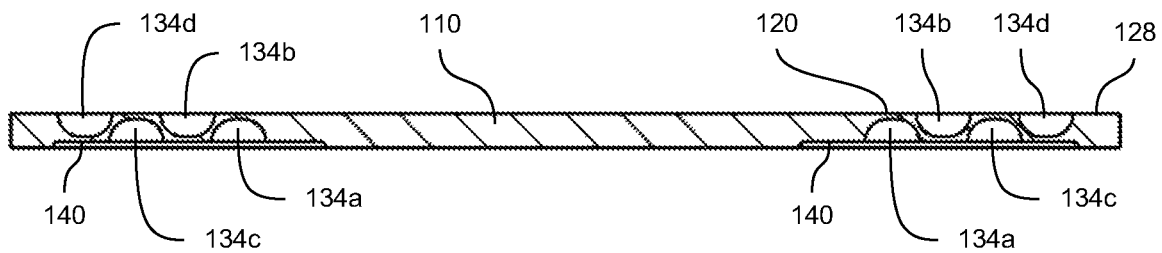
FIG. 25 is a cross-sectional view of an example embodiment of a window element.

With reference to FIG. 25, in some embodiments, some or all of the window 110 does not include the depression 140. The depression 140 can extend across some or all of the flexure 120, but does not extend across the window 110. The depression 140 can be an annular depression, which can surround the window 110. In some cases, the depression 140 can overlap onto part of the window 110, but does not extend to the center region of the window 110 (e.g., does not extend to the portion of the window 110 that transmits light that reaches the sensor to generate an image). The flexure 120 can have a height (e.g., the height of the undulations) that is smaller than the thickness of the window 110, such as by 5%, 10%, 15%, 20%, 25%, 30%, or any values therebetween, or any ranges bounded by any combination of these values.

Figure 26:
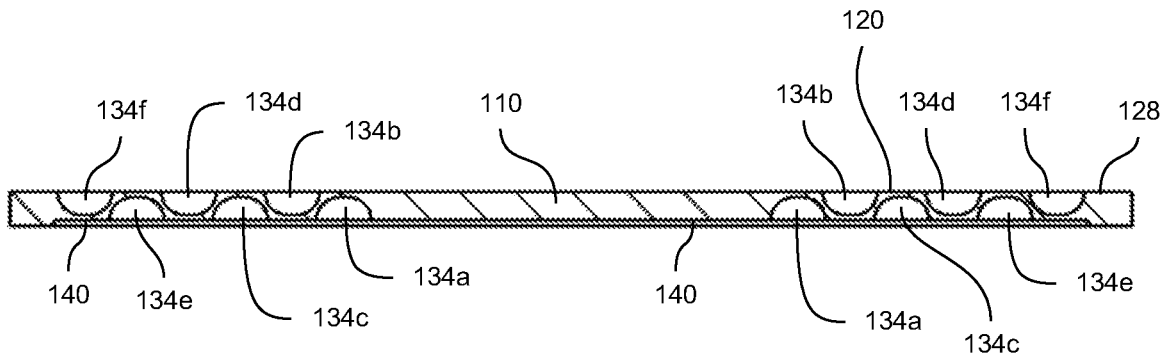
FIG. 26 is a cross-sectional view of another example embodiment of a window element.
Figure 27:
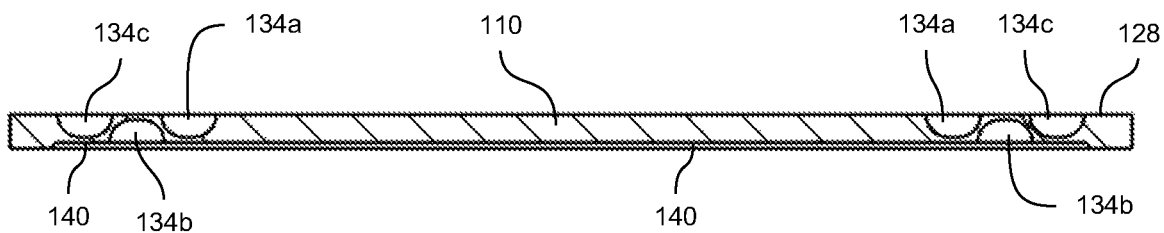
FIG. 27 is a cross-sectional view of another example embodiment of a window element.

The flexures 120 disclosed herein can have any suitable number of recesses and/or undulations. Several embodiments are shown with four recesses 134a-d, although other numbers of recesses can be used. FIG. 26 shows an example embodiment of a flexure 120 that has six recesses 134a-f. FIG. 27 shows an example embodiment of a flexure 120 that has three recesses 134a-c. The flexure 120 can have one, two, three, four, five, six, eight, ten, twelve, or more recesses 134, or any values therebetween, or any ranges bounded by any combination of these values, although other configurations are possible. The flexure 120 can have one, two, three, four, five, six, or more undulations, or any values therebetween, or any ranges bounded by any combination of these values, although other configurations are possible.

Figure 28:
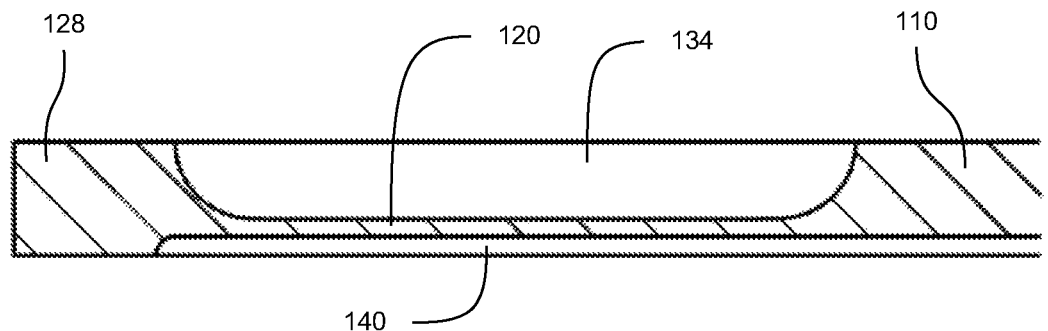
FIG. 28 is a cross-sectional view of another example embodiment of a window element.

In some embodiments, the flexure 120 does not include undulations. The flexure 120 can include a relatively thin region. A recess 134 can be formed in the material (e.g., glass) to produce the thin region of the flexure 120. FIG. 28 shows an example embodiment that is similar to FIG. 20 but a single recess 134 produces a thin flexure portion 120. The depression 140a on one side and the recess 134 on the other side can produce the thin flexure 120. The flexure 120 can have a thickness that is 10%, 15%, 20%, 25%, 30%, 35%, 40%, 45%, 50%, 55%, 60%, 65%, 70%, or 75% of the thickness of either or both of the transparent window 110 and the attachment portion 128, or any values therebetween, or any ranged bounded by any combination of these values, although other values could also be used in some implementations. The depth of the depression 140 can be 10%, 15%, 20%, 25%, 30%, 35%, 40%, 45%, 50%, 55%, 60%, 65%, 70%, or 75% of the depth of the recess 134, or any values therebetween, or any ranged bounded by any combination of these values, although other values could also be used in some implementations.

Figure 29:
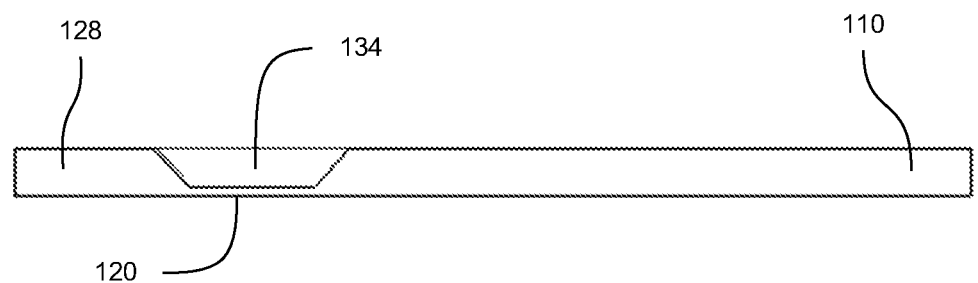
FIG. 29 is a cross-sectional view of another example embodiment of a window element.
Figure 30:
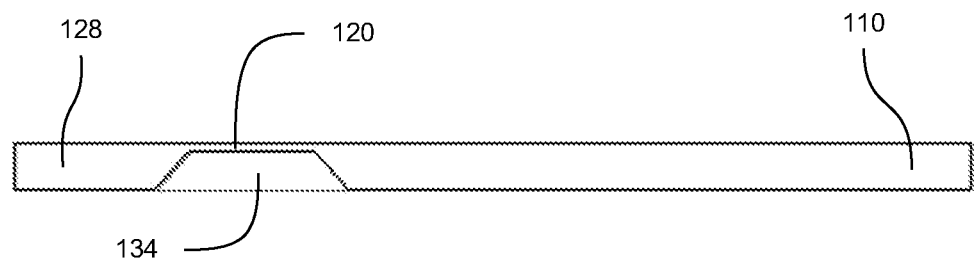
FIG. 30 is a cross-sectional view of another example embodiment of a window element.
Figure 31:
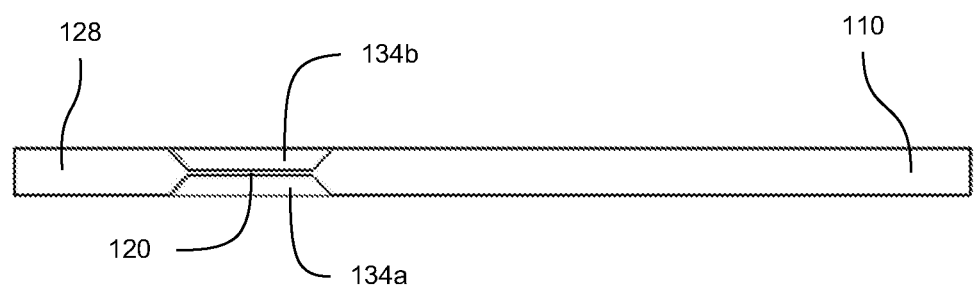
FIG. 31 is a cross-sectional view of another example embodiment of a window element.

With reference to FIG. 29, in some embodiments, the depression 140 can be omitted. The flexure 120 can be formed by a recess 134, such as formed on the side of the window element facing away from the cavity of the liquid lens, as shown in FIG. 29 for an upper window 110. In some cases, the flexure 120 can be formed by a recess 134, such as formed on the side of the window element facing towards the cavity of the liquid lens, as shown in FIG. 30 for an upper window 110. With reference to FIG. 31, the a first recess 134a and a second recess 134b can be positioned on opposite sides of the material to form the flexure 120 at the material between the two recesses 134a-b. The recesses 134a and 134b can be at least partially symmetrical, for example having the same shape, depth, size, and/or position.

Figure 32:
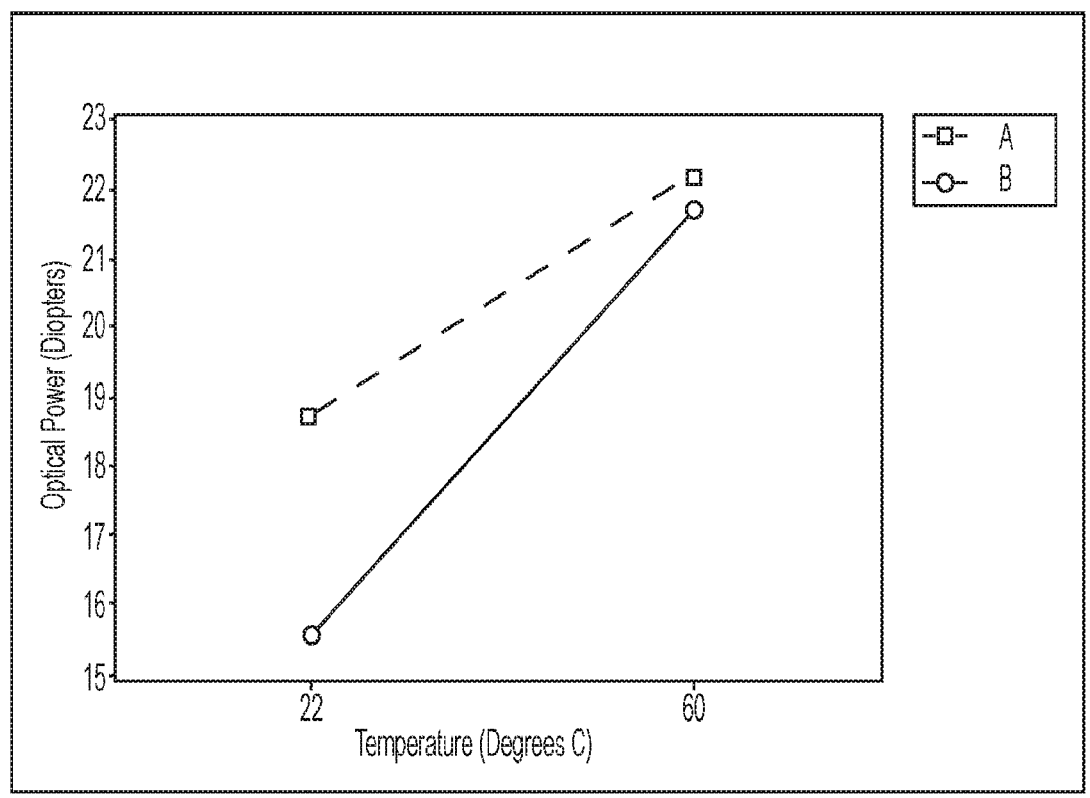
FIG. 32 shows testing data for liquid lenses.

Testing was performed on liquid lenses using an upper window 110 and flexure 120 according to FIGS. 15 to 22. FIG. 32 shows the change of optical power measured in diopters as the temperature was changed from 22 degrees C. to 60 degrees C. For this test the liquid lenses were driven at 50 volts. Line A represents data from testing performed on liquid lenses having a flexure 120 according to FIGS. 15 to 22. Line B represents data from testing performed on liquid lenses that do not have a flexure 120 (e.g., similar to FIG. 14). For liquid lenses having the flexure 120 (line A), the optical power changed from about 18.7 diopters to about 22.1 diopters, for a change of about 3.4 diopters. For liquid lenses not having the flexure 120 (line B), the optical power changed from about 15.5 diopters to about 21.8 diopters, for a change of about 6.3 diopters. Accordingly, the flexure 120 can reduce the changes in optical power that result from thermal expansion as the temperature changes. The liquid lenses having a flexure 120, as disclosed herein, can have a thermally induced optical power change rate of 0.15 diopters per degree C., 0.14 diopters per degree C., 0.13 diopters per degree C., 0.12 diopters per degree C., 0.11 diopters per degree C., 0.1 diopters per degree C., 0.09 diopters per degree C., 0.08 diopters per degree C., 0.07 diopters per degree C., 0.06 diopters per degree C., 0.05 diopters per degree C., 0.04 diopters per degree C., 0.03 diopters per degree C., 0.02 diopters per degree C., or any values therebetween, or any ranges bounded by any combination of these values. The liquid lenses can have a window 110 having a diameter of 20 mm, 15 mm, 12 mm, 10 mm, 8 mm, 6 mm, 5 mm, 4 mm, 3 mm, 2 mm, or less, or any values therebetween, or any ranges bounded by any combination of these values, although other sizes can be used in some implementations.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, is intended to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately"

include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A liquid lens comprising:
a chamber having a volume;
a first fluid contained in the chamber;
a second fluid contained in the chamber, wherein the first fluid and the second fluid are substantially immiscible to form a fluid interface between the first fluid and the second fluid;
one or more first electrodes insulated from the first and second fluids;
one or more second electrodes in electrical communication with the first fluid, wherein a position of the fluid interface is based at least in part on voltage applied between the first and second electrodes;
a window configured to transmit light therethrough along an optical axis; and
a flexure configured to cause the window to displace axially along the optical axis to change the volume of the chamber, wherein the flexure is made of the same material as the window, and further wherein the flexure is integrally formed with the window.

2. The liquid lens of claim 1, wherein the window, when flexed, has a non-spherical curvature.

3. The liquid lens of claim 1, wherein the window and the flexure are made of glass.

4. The liquid lens of claim 1, wherein:
a glass plate comprises the window and the flexure;
the flexure comprises a plurality of concentric recesses surrounding the window; and
the plurality of concentric recesses is formed on alternating sides of the glass plate.

5. The liquid lens of claim 1, wherein:
when the liquid lens is in a flexed state, the window is axially displaced by a flexure displacement distance from bending of the flexure and the window is axially displaced by a window bend distance from bending of the window; and
the flexure displacement distance is greater than the window bend distance.

6. The liquid lens of claim 5, wherein when the liquid lens is in the flexed state, a ratio of the flexure displacement distance to the window bend distance is at least 2 to 1.

7. The liquid lens of claim 5, wherein when the liquid lens is in the flexed state, a ratio of the flexure displacement distance and the window bend distance is at least 4 to 1.

8. The liquid lens of claim 6, wherein the ratio is less than or equal to 12 to 1.

9. The liquid lens of claim 1, wherein the window is flexible, and the flexure is more flexible than the window.

10. The liquid lens of claim 9, wherein the window flexes to have a substantially spherical curvature or a substantially paraboloidal curvature.

11. The liquid lens of claim 1, wherein a thickness of the window is greater than a thickness of the flexure.

12. The liquid lens of claim 1, wherein the flexure is positioned circumferentially around the window.

13. The liquid lens of claim 1, wherein the flexure impedes light that impinges on the flexure from being transmitted through the liquid lens.

14. The liquid lens of claim 1, comprising a thermally induced optical power change rate of no more than 0.1 diopters per degree C.

15. The liquid lens of claim 14, wherein the thermally induced optical power change rate is at least 0.02 diopters per degree C.

16. A camera system comprising:
the liquid lens of claim 1; and
a camera module comprising:
an imaging sensor; and
one or more fixed lenses configured to direct light onto the imaging sensor, wherein operating the camera module produces heat that causes a change in a focal length of the one or more fixed lenses;
wherein the liquid lens is thermally coupled to the camera module such that heat from the camera module is transferred to the liquid lens, and the heat transferred to the liquid lens flexes the window to produce a change in a focal length of the liquid lens that at least partially counters the change in the focal length of the one or more fixed lenses in the camera module.

17. A liquid lens comprising:
a chamber having a volume;
a first fluid contained in the chamber;
a second fluid contained in the chamber, wherein the first fluid and the second fluid are substantially immiscible to form a fluid interface between the first fluid and the second fluid;
one or more first electrodes insulated from the first and second fluids;
one or more second electrodes in electrical communication with the first fluid, wherein a position of the fluid interface is based at least in part on voltage applied between the first and second electrodes;
a window configured to transmit light therethrough along an optical axis; and
a flexure configured to cause the window to displace axially along the optical axis to change the volume of the chamber, wherein the flexure is integrally formed with the window;
wherein when the liquid lens is in a flexed state, the flexure bends so that a peripheral portion of the window is displaced axially by a flexure displacement distance;
wherein when the liquid lens is in the flexed state, the window bends so that a center portion of the window is displaced axially by a total window displacement distance that is greater than the flexure displacement distance; and
wherein the flexure displacement distance is between 60% and 95% of the total window displacement distance.

18. A liquid lens comprising:
a cavity having a first end and a second end, wherein an optical axis extends through the cavity from the first end to the second end;
a plurality of fluids in the cavity, wherein the plurality of fluids form at least one fluid interface, and wherein the optical axis extends through the at least one fluid interface;
a support structure positioned radially outward of the first end of the cavity; and
a glass plate comprising:
a window portion positioned over the first end of the cavity, wherein the optical axis extends through the window portion;

an attachment portion positioned radially outward of the window portion, the attachment portion attached to the support structure; and a flexure portion between the window portion and the attachment portion, wherein the flexure portion is thinner than the window portion, and further wherein the flexure is integrally formed with the window.

19. The liquid lens of claim 18, wherein the flexure portion comprises a plurality of concentric recesses.

20. The liquid lens of claim 18, wherein the flexure portion is a ring flexure that surrounds the window portion.

* * * * *